United States Patent
Ikeda

(10) Patent No.: US 11,321,005 B2
(45) Date of Patent: May 3, 2022

(54) DATA BACKUP SYSTEM, RELAY SITE STORAGE, DATA BACKUP METHOD, AND CONTROL PROGRAM FOR RELAY SITE STORAGE

(71) Applicant: NEC Platforms, Ltd., Kawasaki (JP)

(72) Inventor: Junichiro Ikeda, Kanagawa (JP)

(73) Assignee: NEC Platforms, Ltd., Kanagawa (JP)

(*) Notice: Subject to any disclaimer, the term of this patent is extended or adjusted under 35 U.S.C. 154(b) by 56 days.

(21) Appl. No.: 16/766,458

(22) PCT Filed: Nov. 21, 2018

(86) PCT No.: PCT/JP2018/042918
§ 371 (c)(1),
(2) Date: May 22, 2020

(87) PCT Pub. No.: WO2019/107232
PCT Pub. Date: Jun. 6, 2019

(65) Prior Publication Data
US 2020/0379647 A1  Dec. 3, 2020

(30) Foreign Application Priority Data

Nov. 28, 2017  (JP) .............................. JP2017-228300

(51) Int. Cl.
*G06F 3/06* (2006.01)

(52) U.S. Cl.
CPC ............ *G06F 3/065* (2013.01); *G06F 3/0619* (2013.01); *G06F 3/0683* (2013.01)

(58) Field of Classification Search
CPC ....... G06F 3/065; G06F 3/0619; G06F 3/0683
See application file for complete search history.

(56) References Cited

U.S. PATENT DOCUMENTS

| | | |
|---|---|---|
| 2005/0210078 A1 | 9/2005 | Maruyama et al. |
| 2006/0085609 A1 | 4/2006 | Ninose et al. |
| 2006/0085610 A1* | 4/2006 | Iwamura ............. G06F 11/2058 |
| | | 711/162 |
| 2011/0145532 A1 | 6/2011 | Deguchi et al. |

FOREIGN PATENT DOCUMENTS

| | | |
|---|---|---|
| JP | 2006-113783 A | 4/2006 |
| JP | 2006-119745 A | 5/2006 |
| JP | 4422519 B2 | 2/2010 |
| JP | 2010-182154 A | 8/2010 |
| JP | 2010-231548 A | 10/2010 |
| JP | 2012-022645 A | 2/2012 |
| JP | 2012-514778 A | 6/2012 |

OTHER PUBLICATIONS

International Search Report for PCT Application No. PCT/JP2018/042918, dated Feb. 26, 2019.
English translation of Written opinion for PCT Application No. PCT/JP2018/042918, dated Feb. 26, 2019.

* cited by examiner

*Primary Examiner* — Eric Cardwell

(57) ABSTRACT

A data backup system is provided with: a plurality of devices for main site storage, one device for relay site storage, and one or more devices for backup site storage. While the main site is operating normally, the relay site storage implements synchronized replication of data held by the main site storage and data held by the relay site storage. After the main site has stopped operating normally, the data held by the relay site storage and the data held by the backup site storage are subjected to consistency ensuring replication.

13 Claims, 11 Drawing Sheets

Fig.7

PAIR INFORMATION MANAGEMENT UNIT 240

| COPY SOURCE STORAGE ID | COPY SOURCE VOLUME NUMBER | COPY DESTINATION STORAGE ID | COPY DESTINATION VOLUME NUMBER |
|---|---|---|---|
| 1 | 0000 | 3 | 0001 |
| 2 | 0005 | 3 | 0009 |
| 3 | 0002 | 4 | 0002 |
| 4 | 0004 | 5 | 0005 |
| 3 | 0001 | 4 | 0001 |
| 3 | 0009 | 5 | 0010 |

DATA BACKUP SYSTEM, RELAY SITE STORAGE, DATA BACKUP METHOD, AND CONTROL PROGRAM FOR RELAY SITE STORAGE

This application is a National Stage Entry of PCT/JP2018/042918 filed on Nov. 21, 2018, which claims priority from Japanese Patent Application 2017-228300 filed on Nov. 28, 2017, the contents of all of which are incorporated herein by reference, in their entirety.

TECHNICAL FIELD

The present invention relates to a technology of backing up data.

BACKGROUND ART

In disaster recovery, a service is provided by a certain site (main site) under normal conditions. Further, data (storage data) being required for providing a service and being held by a storage in the main site are copied (replicated) to a storage in another site (backup site) under normal conditions. Then, when the main site is stricken by a disaster, the service is provided by the backup site.

In order for a service to be consistently inherited from the main site to the backup site in such a disaster recovery system, integrity between data in the main site and data in the backup site needs to be guaranteed in data copying from the main site to the backup site. For that purpose, write data need to be written into a storage in the backup site according to the writing order of the write data into a storage in the main site. When interrelated storage data are held by a plurality of storages in the main site in particular, integrity (writing order) between data held by the storages needs to be also guaranteed in the backup site.

In disaster recovery, it is desirable that storage data in the backup site be copied to yet another site in preparation for a failure in the backup site while the main site is stricken by a disaster and a service is being provided by the backup site.

PTL 1 discloses an example of a technology of normally performing an operation in two sites and when a failure occurs in a main site, continuing the operation in the remaining site. An information system in PTL 1 includes a main site, a remote site (backup site), and a journal site. The main site includes a main storage and a first host computer. The first host computer reads and writes data from and into the main storage. The remote site includes a duplicate storage and a second host computer. The second host computer reads and writes data from and into the duplicate storage. The journal site includes a journal storage. The main storage, the duplicate storage, and the journal storage are interconnected by a network. When data held by the main storage are updated by the first host computer, the main storage synchronously copies the updated data to the duplicate storage. When a communication failure occurs in the network between the main storage and the duplicate storage, the main storage synchronously copies data updated in the main storage to the journal storage. Then, the journal storage quasi-synchronously copies data updated in the journal storage to the duplicate storage. As a result of the configuration described above, integrity (consistency) of data between the main storage and the duplicate storage is guaranteed until a communication failure occurs in the network between the main storage and the duplicate storage, in the information system in PTL 1.

PTL 2 discloses an example of a technology of normally performing an operation in three sites and when a failure occurs in a main site, continuing the operation in the two remaining sites. Synchronous remote copying from a storage system in a primary site to a storage system in a first secondary site is normally performed in a computer system in PTL 2. Further, asynchronous remote copying from the storage system in the first secondary site to a storage system in a second secondary site is normally performed. When a failure occurs in the primary site, the operation is continued in the remaining two sites without copying all data, by copying only the data difference between the storage system in the first secondary site and the storage system in the second secondary site.

PTL 3 discloses an example of a technology of normally performing an operation in two sites and when a failure occurs in a main site, continuing the operation in the remaining site. One of two storages in a first site (main site) is a numbering storage in an information processing system in PTL 3. When either of the storages in the first site writes write data from a host, the numbering storage generates information for order guarantee and assigns the information to the write data. Then the storage in the first site transfers the write data to a storage in a second site (backup site). The storage in the second site writes the write data from the storage in the first site according to an order indicated by the information for order guarantee. As a result of the operation described above, integrity between data held by a plurality of storages in the main site is also guaranteed in the backup site in the information processing system in PTL 3.

CITATION LIST

Patent Literature

PTL 1: Japanese Unexamined Patent Application Publication No. 2010-182154
PTL 2: Japanese Unexamined Patent Application Publication No. 2006-119745
PTL 3: Japanese Patent No. 4422519

SUMMARY OF INVENTION

Technical Problem

While the main site includes one main storage in the information system in PTL 1, a case of the main site including a plurality of main storages is not considered. In other words, the information system in PTL 1 has a problem that when a main storage is added to the main site, integrity between a plurality of pieces of data respectively held in different main storages is not guaranteed in the backup site. Further, an operation in three sites is not considered in the information system in PTL 1. In other words, the information system in PTL 1 has a problem that data in the backup site are not backed up after the main site stops operating normally.

While the main site includes one storage system in the computer system in PTL 2, a case of the main site including a plurality of storage systems is not considered. In other words, the computer system in PTL 2 has a problem that when a storage system is added to the main site, integrity among a plurality of pieces of data respectively held in different storage systems in the main site is not guaranteed in the backup site.

An operation in three sites is not considered in the information processing system in PTL 3. In other words, the information processing system in PTL 3 has a problem that data in the backup site are not backed up after the main site stops operating normally.

As described above, the technologies described in PTLs 1 to 3 have a problem that when a main site includes a plurality of storages, integrity of data among three sites including the main site cannot be guaranteed while the main site is operating normally, and also integrity of data between two sites excluding the main site cannot be guaranteed without copying all data, after the main site stops operating normally.

The present invention has been made in view of the aforementioned problem, and a main object of the present invention is, when a main site includes a plurality of storages, to guarantee integrity of data among three sites including the main site while the main site is operating normally and also to guarantee integrity of data between two sites excluding the main site without copying all data, after the main site stops operating normally.

Solution to Problem

A data backup system according to an aspect of the present invention includes: a plurality of main site storages, each main site storage being installed in a main site and including: a first storage means; and a first writing means for, when receiving write data from a main site host installed in the main site, immediately writing the write data into the first storage means according to the order of reception; one relay site storage being installed in a relay site, being connected to the plurality of main site storages, and including: a second storage means; and a second writing means for, when receiving write data from a relay site host installed in the relay site or any one of the plurality of main site storages, immediately writing the write data into the second storage means according to the order of reception; and one or more backup site storages, each backup site storage being installed in a backup site, being connected to the relay site storage, and including: a third storage means; and a third writing means for, when receiving write data from the relay site storage, immediately writing the write data into the third storage means according to the order of reception, wherein the first writing means, when receiving write data, immediately transmits the write data to the relay site storage according to the order of reception and, when receiving a response indicating write completion of the write data from the relay site storage, immediately transmits the response to a source of the write data according to the order of reception, and the second writing means, when receiving write data, immediately transmits a response indicating write completion of the write data to a source of the write data according to the order of reception and also performs storing that the write data are untransmitted to a backup site storage and transmitting, to the backup site storage, write data allowing generation of a copy of data held by the second storage means by overwriting data held by the third storage means with the write data.

A relay site storage according to an aspect of the present invention is a relay site storage in a data backup system including: a plurality of main site storages, each main site storage being installed in a main site and including: a first storage means; and a first writing means for, when receiving write data from a main site host installed in the main site, immediately writing the write data into the first storage means according to the order of reception; one relay site storage being installed in a relay site, being connected to the plurality of main site storages, and including: a second storage means; and a second writing means for, when receiving write data from a relay site host installed in the relay site or any one of the plurality of main site storages, immediately writing the write data into the second storage means according to the order of reception; and one or more backup site storages, each backup site storage being installed in a backup site, being connected to the relay site storage, and including: a third storage means; and a third writing means for, when receiving write data from the relay site storage, immediately writing the write data into the third storage means according to the order of reception, the relay site storage including, in a case of the first writing means, when receiving write data, immediately transmitting the write data to the relay site storage according to the order of reception and when receiving a response indicating write completion of the write data from the relay site storage, immediately transmitting the response to a source of the write data according to the order of reception, the second writing means for, when receiving write data, immediately transmitting a response indicating write completion of the write data to a source of the write data according to the order of reception and also performing storing that the write data are untransmitted to a backup site storage and transmitting, to the backup site storage, write data allowing generation of a copy of data held by the second storage means by overwriting data held by the third storage means with the write data.

A data backup method according to an aspect of the present invention is a data backup method for a data backup system including: a plurality of main site storages, each main site storage being installed in a main site and including: a first storage means; and a first writing means for, when receiving write data from a main site host installed in the main site, immediately writing the write data into the first storage means according to the order of reception; one relay site storage being installed in a relay site, being connected to the plurality of main site storages, and including: a second storage means; and a second writing means for, when receiving write data from a relay site host installed in the relay site or any one of the plurality of main site storages, immediately writing the write data into the second storage means according to the order of reception; and one or more backup site storages, each backup site storage being installed in a backup site, being connected to the relay site storage, and including: a third storage means; and a third writing means for, when receiving write data from the relay site storage, immediately writing the write data into the third storage means according to the order of reception, the data backup method including: by the first writing means, when receiving write data, immediately transmitting the write data to the relay site storage according to the order of reception, and, when receiving a response indicating write completion of the write data from the relay site storage, immediately transmitting the response to a source of the write data according to the order of reception; and, by the second writing means, when receiving write data, immediately transmitting a response indicating write completion of the write data to a source of the write data according to the order of reception, and also performing storing that the write data are untransmitted to a backup site storage and transmitting, to the backup site storage, write data allowing generation of a copy of data held by the second storage means by overwriting data held by the third storage means with the write data.

A control program for a relay site storage or a non-transitory storage medium having such a control program stored thereon, according to an aspect of the present invention, causes, in a data backup system including: a plurality of main site storages, each main site storage being installed in a main site and including: a first storage means; and a first writing means for, when receiving write data from a main site host installed in the main site, immediately writing the write data into the first storage means according to the order of reception; one relay site storage being installed in a relay site, being connected to the plurality of main site storages, and including: a second storage means; and a second writing means for, when receiving write data from a relay site host installed in the relay site or any one of the plurality of main site storages, immediately writing the write data into the second storage means according to the order of reception; and one or more backup site storages, each backup site storage being installed in a backup site, being connected to the relay site storage, and including: a third storage means; and a third writing means for, when receiving write data from the relay site storage, immediately writing the write data into the third storage means according to the order of reception, a computer included in the relay site storage in a case of the first writing means, when receiving write data, immediately transmitting the write data to the relay site storage according to the order of reception and, when receiving a response indicating write completion of the write data from the relay site storage, immediately transmitting the response to a source of the write data according to the order of reception to execute: processing of, when receiving write data, immediately transmitting a response indicating write completion of the write data to a source of the write data according to the order of reception and also storing that the write data are untransmitted to a backup site storage; and processing of transmitting, to the backup site storage, write data allowing generation of a copy of data held by the second storage means by overwriting data held by the third storage means with the write data.

Advantageous Effects of Invention

The present invention provides an effect of, when a main site includes a plurality of storages, guaranteeing integrity of data among three sites including the main site while the main site is operating normally and guaranteeing integrity of data between two sites excluding the main site without copying all data, after the main site stops operating normally.

BRIEF DESCRIPTION OF DRAWINGS

FIG. 7 is a block diagram illustrating an example of a structure of a pair information management unit according to the second example embodiment of the present invention.

FIRST EXAMPLE EMBODIMENT

Example embodiments of the present invention will be described in detail below with reference to drawings. In all drawings, equivalent components are given the same reference sign, and description is omitted as appropriate.

FIRST EXAMPLE EMBODIMENT

A first example embodiment of the present invention being a basis of each example embodiment of the present invention will be described.

A configuration according to the present example embodiment will be described.

Figure 1:
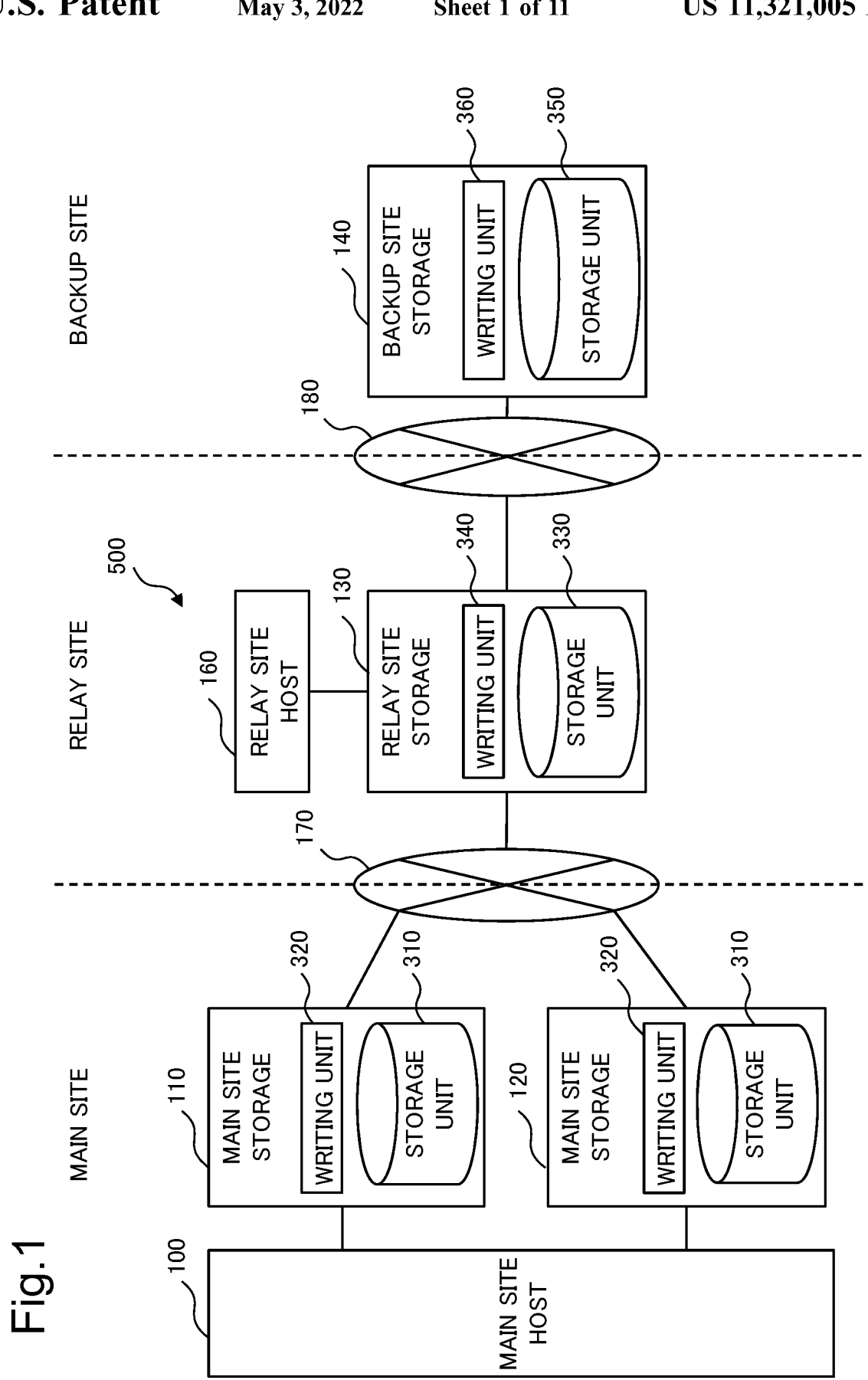
FIG. 1 is a block diagram illustrating an example of a configuration of a data backup system according to a first example embodiment of the present invention.

FIG. 1 is a block diagram illustrating an example of a configuration of a data backup system according to the first example embodiment of the present invention.

A data backup system 500 according to the present example embodiment includes a plurality of main site storages 110, 120, . . . , one relay site storage 130, and one or more backup site storages 140.

The main site storages 110, 120, . . . are installed in a main site.

The relay site storage 130 is installed in a relay site and is connected to the plurality of main site storages 110, 120, . . . through a network 170.

The backup site storage 140 is installed in a backup site and is connected to the relay site storage 130 through a network 180.

Normally, the main site, the relay site, and the backup site are sites geographically remote from one another.

Each of the main site storages 110, 120, . . . includes a storage unit 310 and a writing unit 320.

The relay site storage 130 includes a storage unit 330 and a writing unit 340.

The backup site storage 140 includes a storage unit 350 and a writing unit 360.

Each of the storage units 310, 330, and 350 is a nonvolatile storage device and, for example, is a hard disk drive. Each of the storage units 310, 330, and 350 may be configured to provide redundancy by the storage device based on redundant arrays of inexpensive disks (RAID) or the like. Each of the storage units 310, 330, and 350 may include a write cache or a read cache. For ease of description, it is assumed in the following description that, in each of the storage units 310, 330, and 350, redundancy is suitably provided for a storage device, an input/output (IO) interface, a power source, and the like, and normally, a failure does not occur as an entire device, and writing and reading of data do not fail except for a case of a disaster or the like.

When receiving write data from a main site host 100 (a source) installed in the main site, the writing unit 320 immediately writes the write data into the storage unit 310 according to the order of reception. When receiving write data, the writing unit 320 immediately transmits the write data to the relay site storage according to the order of reception. "Immediately" writing (transmitting, storing) data hereinafter means writing (transmitting, storing) data without waiting for writing (transmitting, storing) other write data, instead of writing (transmitting, storing) data with waiting for writing (transmitting, storing) other write data. When receiving a response indicating write completion of the write data from the relay site storage 130, the writing unit 320 immediately transmits the response to the source of the write data according to the order of reception. An operation equivalent to an operation by the aforementioned writing unit 320 from reception of write data from a source to transmission of a response to the source is hereinafter referred to as "synchronous replication." Replication is hereinafter also referred to as "copying."

In synchronous replication, unless synchronous replication of a piece of write data is discontinued, "integrity" between data at the copy source and data at the copy destination is always guaranteed. Integrity refers to, when a host is accessing data (reading or writing data) at the copy source and at a certain point in time, accesses data at the copy destination, the host being able to access the same data as those at the copy source, at the copy destination.

The writing unit 340 receives write data from a relay site host 160 installed at the relay site or any one of the plurality of the main site storages 110, 120, ... (a source). Then, when receiving the write data, the writing unit 340 immediately writes the write data into the storage unit 330 according to the order of reception. Further, when receiving the write data, the writing unit 340 immediately transmits a response indicating write completion of the write data to the source of the write data according to the order of reception and also stores that the write data are untransmitted to the backup site storage 140 (replication destination). Further, the writing unit 340 transmits, to the replication destination, write data (overwrite data) allowing generation of a copy of data held in the storage unit 330 by overwriting data held in the storage unit 350 with the write data. An operation equivalent to an operation by the aforementioned writing unit 340 from reception of write data from a source to transmission of write data to a replication destination is hereinafter referred to as "integrity-guaranteed replication."

In integrity-guaranteed replication, integrity between data at a copy source and data at a copy destination is guaranteed at a point when integrity-guaranteed replication of all write data is completed. However, it is assumed that integrity-guaranteed replication does not include copying, at all times, all data at a copy source to a copy destination.

Overwrite data may be a series of write data received but untransmitted by the writing unit 340 in which an area where data are to be written and an order of writing data are defined for data held by the storage unit 350. Integrity-guaranteed replication in this case is referred to as "quasi-synchronous replication."

Alternatively, overwrite data may be a series of data held by the storage unit 330 in which areas where data are to be written without overlapping one another are defined for data held by the storage unit 350. Integrity-guaranteed replication in this case is referred to as "asynchronous replication."

For example, an area where data are to be written is identified by an identifier (such as a volume number and/or a record number) for specifying the position of the area in the storage unit 310, 330, or 350, or an identifier (such as a file name) for specifying the name of the area.

When receiving write data from the relay site storage 130, the writing unit 360 immediately writes the write data into the storage unit 350 according to the order of reception.

Under normal conditions, the relay site host 160 monitors execution of processing by the main site host 100 including writing and reading data into and from the main site storage 110, 120, .... Then, while confirming normal execution of the monitored processing, the relay site host 160 stands by for execution of processing corresponding to the processing executed by the main site host 100 and including writing and reading data into and from the relay site storage 130. Then, after failing to confirm normal execution of the monitored processing, the relay site host 160 starts execution of the processing corresponding to the processing executed by the main site host 100 and including writing and reading data into and from the relay site storage 130.

An operation according to the present example embodiment will be described.

Figure 2:
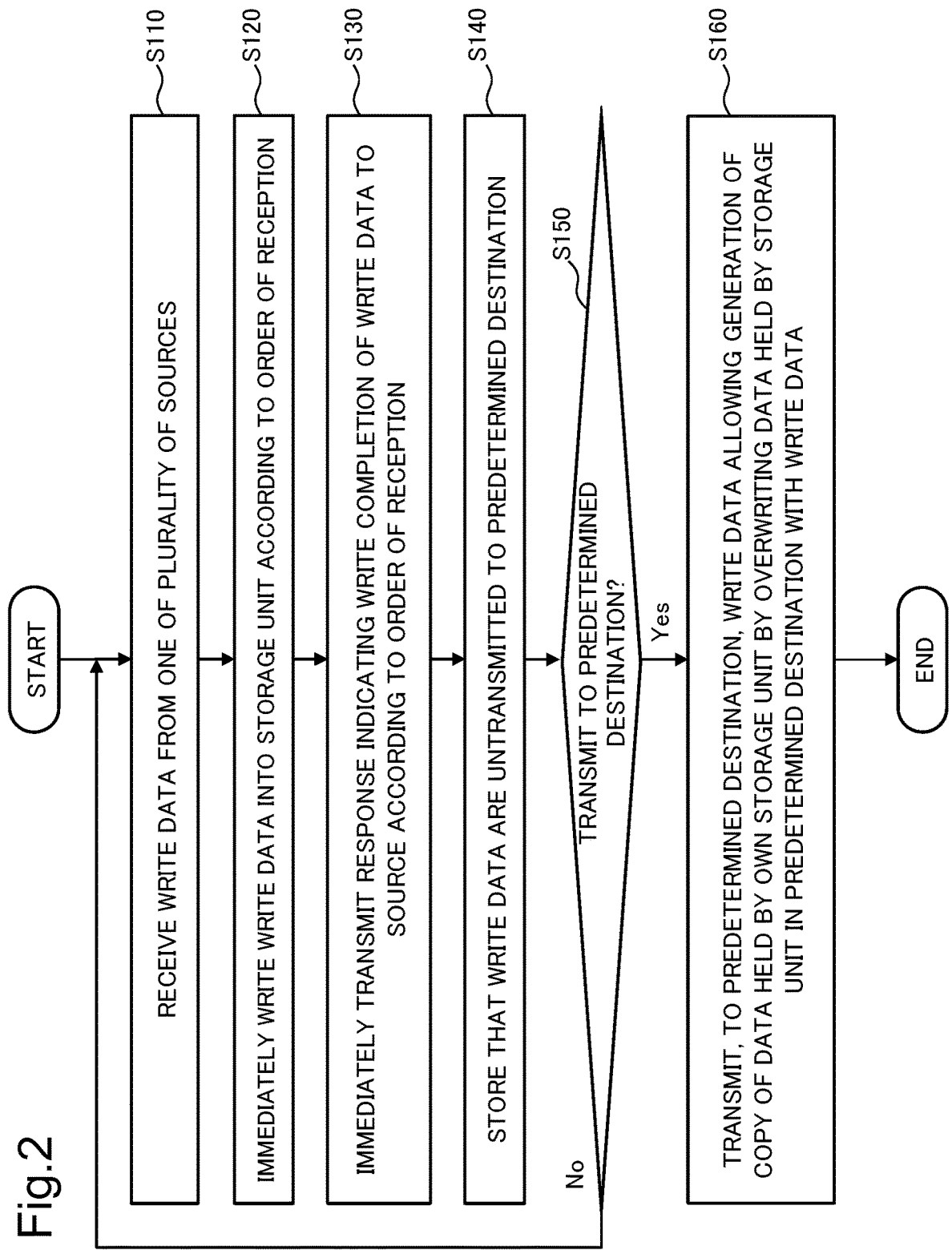
FIG. 2 is a flowchart illustrating an operation of the data backup system according to the first example embodiment of the present invention.

FIG. 2 is a flowchart illustrating an operation of the data backup system according to the first example embodiment of the present invention. More specifically, FIG. 2 illustrates an operation of the relay site storage 130 according to the present example embodiment. The flowchart illustrated in FIG. 2 and the following description are examples, and an processing order or the like may be reversed, processing may be returned, or processing may be repeated as appropriate depending on required processing.

The writing unit 340 receives write data from one of a plurality of sources (Step S110).

Next, the writing unit 340 immediately writes the write data into the storage unit 330 according to the order of reception (Step S120).

Next, the writing unit 340 immediately transmits a response indicating write completion of the write data to the source of the write data according to the order of reception (Step S130).

At the same time, the writing unit 340 stores that the write data are untransmitted to the backup site storage 140 (replication (Step S140).

Next, the writing unit 340 determines whether the current time is a timing for transmitting data to the replication destination (Step S150).

When the current time is a timing for transmitting data to the replication destination (Step S150: Yes), the writing unit 340 transmits the overwrite data to the replication destination (Step S160) and ends the processing.

When the current time is not a timing for transmitting data to the replication destination (Step S150: No), the writing unit 340 returns to the processing in Step S110.

The writing unit 340 repeatedly executes the aforementioned operation.

Figure 3:
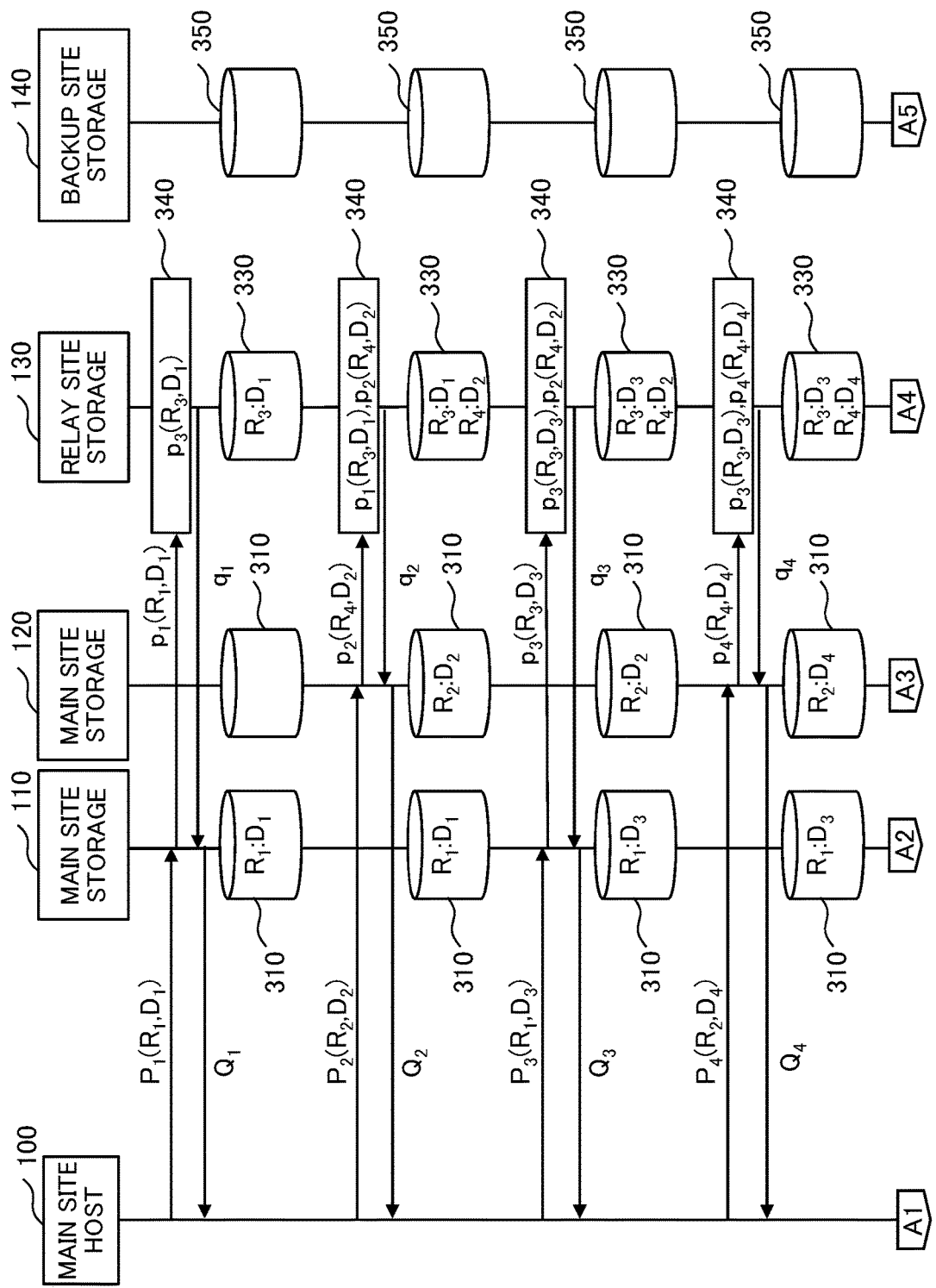
FIG. 3 is the first half of a sequence diagram illustrating an example of the operation of the data backup system according to the first example embodiment of the present invention.
Figure 4:
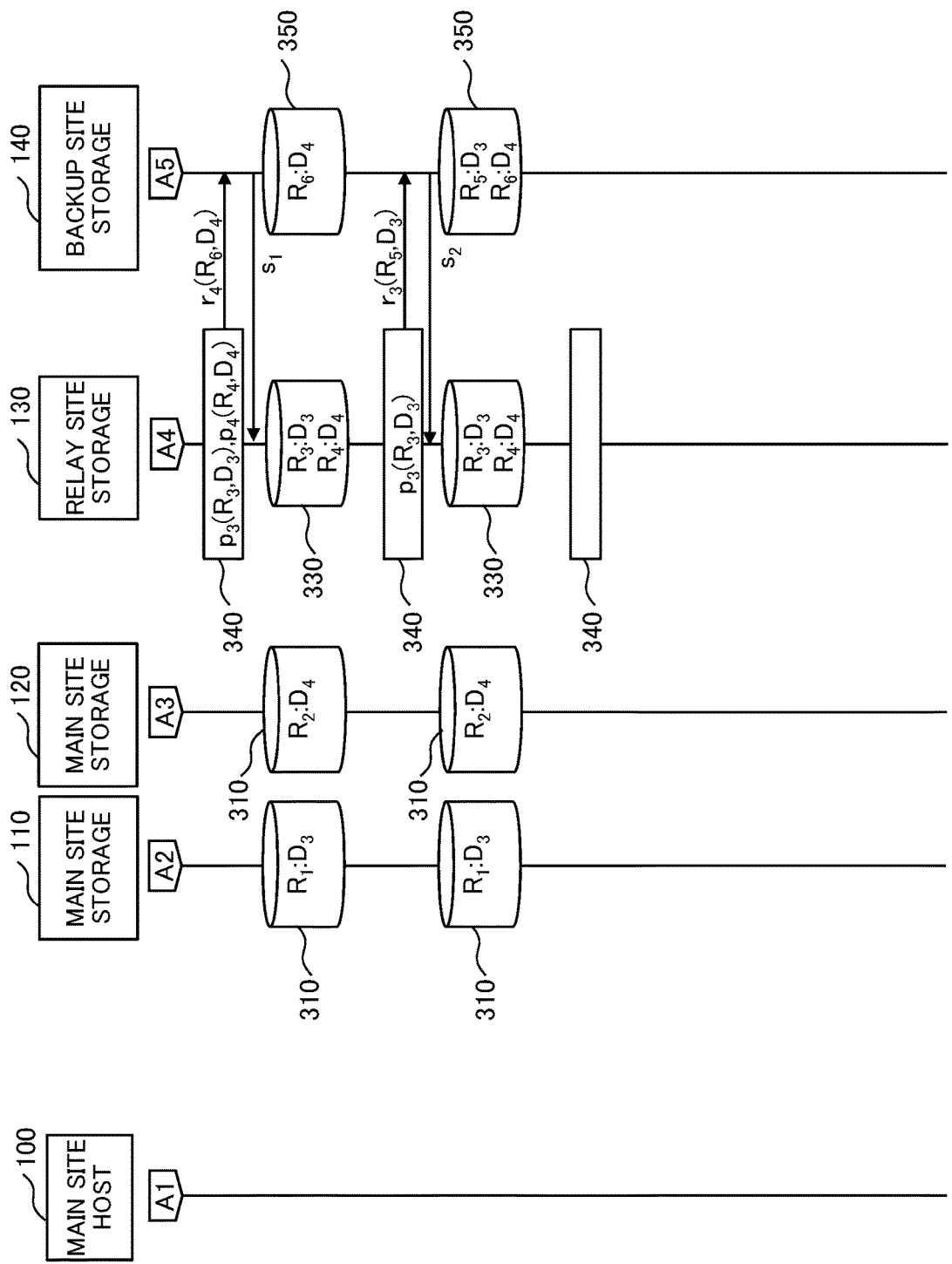
FIG. 4 is the second half of the sequence diagram illustrating the example of the operation of the data backup system according to the first example embodiment of the present invention.

FIG. 3 and FIG. 4 are sequence diagrams illustrating an example of the operation of the data backup system according to the first example embodiment of the present invention. FIG. 3 illustrates the first half of the operation, and FIG. 4 illustrates the second half of the operation.

In FIG. 3 and FIG. 4, pieces of write data are denoted as $P_n$, $p_n$, and $r_n$ (where n is a natural number), and responses to the respective pieces of write data are denoted as $Q_n$, $q_n$, and $sn$. The first argument of write data denotes an identifier of a write destination (area), and the second argument denotes data to be written. It is assumed that areas $R_1$ and $R_2$ included in the main site storage 110 and 120 are respectively related to areas $R_3$ and $R_4$ included in the relay site storage 130 and are respectively related to areas $R_5$ and $R_6$ included in the backup site storage 140. It is assumed that each of the main site storages 110 and 120, and the relay site storage 130 holds the aforementioned correspondence relation.

(1) Writing data $D_1$

As illustrated in FIG. 3, the main site host 100 transmits write data $P_1(R_1, D_1)$ to the main site storage 110.

The main site storage 110 receives the write data $P_1$ from the main site host 100.

The main site storage 110 immediately writes the data $D_1$ into the area $R_1$ in the storage unit 310 according to the order of reception.

The main site storage 110 immediately transmits the write data $P_1$ to the relay site storage 130 according to the order of reception. At this time, the main site storage 110 changes the write destination of the received write data $P_1$ from the area $R_1$ to the area $R_3$ and transmits write data $p_1(R_3, D_1)$.

The relay site storage 130 receives the write data $p_1$ from the main site storage 110.

The relay site storage 130 immediately writes the data $D_1$ into the area $R_3$ in the storage unit 330 according to the order of reception.

The relay site storage 130 immediately stores the write data $p_1$ according to the order of reception. When the writing unit 340 in the relay site storage 130 already holds write data written in the area $R_3$ in the storage unit 330, the writing unit 340 in the relay site storage 130 overwrites the already held write data with the write data $p_1$. In this case, the relay site storage 130 does not overwrite write data.

The relay site storage 130 transmits a response $q_1$ indicating write completion of the write data $p_1$ to the main site storage 110.

The main site storage 110 receives the response $q_1$ from the relay site storage 130.

The main site storage 110 immediately transmits a response $Q_1$ indicating write completion of the write data $P_1$ to the source of the write data $P_1$ (the main site host 100) according to the order of reception.

The main site host 100 receives the response $Q_1$ from the main site storage 110.

At this point in time, the relay site storage 130 holds a set of overwrite data $\{p_1(R_3, D_1)\}$. The area $R_1$ in the storage unit 310 in the main site storage 110 holds the data $D_1$. The area $R_3$ in the storage unit 330 in the relay site storage 130 holds the data $D_1$.

(2) Writing Data $D_2$

The main site host 100 transmits write data $P_2(R_2, D_2)$ to the main site storage 120.

The main site storage 120 receives the write data $P_2$ from the main site host 100.

The main site storage 120 immediately writes the data $D_2$ into the area $R_2$ in the storage unit 310 according to the order of reception.

The main site storage 120 immediately transmits the write data $P_2$ to the relay site storage 130 according to the order of reception. At this time, the main site storage 120 changes the write destination of the received write data $P_2$ from the area $R_2$ to the area $R_4$ and transmits write data $p_2(R_4, D_2)$.

The relay site storage 130 receives the write data $p_2$ from the main site storage 120.

The relay site storage 130 immediately writes the data $D_2$ into the area $R_4$ in the storage unit 330 according to the order of reception.

The relay site storage 130 immediately stores the write data $p_2$ according to the order of reception. When the writing unit 340 in the relay site storage 130 already holds write data written in the area $R_4$ in the storage unit 330, the writing unit 340 in the relay site storage 130 overwrites the already held write data with the write data $p_2$. In this case, the relay site storage 130 does not overwrite write data.

The relay site storage 130 transmits a response $q_2$ indicating write completion of the write data $p_2$ to the main site storage 120.

The main site storage 120 receives the response $q_2$ from the relay site storage 130.

The main site storage 120 immediately transmits a response $Q_2$ indicating write completion of the write data $P_2$ to the source of the write data $P_2$ (the main site host 100) according to the order of reception.

The main site host 100 receives the response $Q_2$ from the main site storage 120.

At this point in time, the relay site storage 130 holds a set of overwrite data $\{p_1(R_3, p_2(R_4, D_2)\}$. The area $R_2$ in the storage unit 310 in the main site storage 120 holds the data $D_2$. The area $R_4$ in the storage unit 330 in the relay site storage 130 holds the data $D_2$.

(3) Writing data $D_3$

The main site host 100 transmits write data $P_3(R_1, D_3)$ to the main site storage 110.

The main site storage 110 receives the write data $P_3$ from the main site host 100.

The main site storage 110 immediately writes the data $D_3$ into the area $R_1$ in the storage unit 310 according to the order of reception.

The main site storage 110 immediately transmits the write data $P_3$ to the relay site storage 130 according to the order of reception. At this time, the main site storage 110 changes the write destination of the received write data $P_3$ from the area $R_1$ to the area $R_3$ and transmits write data $p_3(R_3, D_3)$.

The relay site storage 130 receives the write data $p_3$ from the main site storage 110.

The relay site storage 130 immediately writes the data $D_3$ into the area $R_3$ in the storage unit 330 according to the order of reception.

The relay site storage 130 immediately stores the write data $p_3$ according to the order of reception. When the writing unit 340 in the relay site storage 130 already holds write data written in the area $R_3$ in the storage unit 330, the writing unit 340 in the relay site storage 130 overwrites the already held write data with the write data $p_3$. In this case, the relay site storage 130 overwrites write data.

The relay site storage 130 transmits a response $q_3$ indicating write completion of the write data $p_3$ to the main site storage 110.

The main site storage 110 receives the response $q_3$ from the relay site storage 130.

The main site storage 110 immediately transmits a response $Q_3$ indicating write completion of the write data $P_3$ to the source of the write data $P_3$ (the main site host 100) according to the order of reception.

The main site host 100 receives the response $Q_3$ from the main site storage 110.

At this point in time, the relay site storage 130 holds a set of overwrite data $\{p_3(R_3, D_3), p_2(R_4, D_2)\}$. The area $R_1$ in the storage unit 310 in the main site storage 110 holds the data $D_3$. The area $R_3$ in the storage unit 330 in the relay site storage 130 holds the data $D_3$.

(4) Writing Data $D_4$

The main site host 100 transmits write data $P_4(R_2, D_4)$ to the main site storage 120.

The main site storage 120 receives the write data $P_4$ from the main site host 100.

The main site storage 120 immediately writes the data $D_4$ into the area $R_2$ in the storage unit 310 according to the order of reception.

The main site storage 120 immediately transmits the write data $P_4$ to the relay site storage 130 according to the order of reception. At this time, the main site storage 120 changes the write destination of the received write data $P_4$ from the area $R_2$ to the area $R_4$ and transmits write data $p_4(R_4, D_4)$.

The relay site storage 130 receives the write data $p_4$ from the main site storage 120.

The relay site storage 130 immediately writes the data $D_4$ into the area $R_4$ in the storage unit 330 according to the order of reception.

The relay site storage 130 immediately stores the write data $p_4$ according to the order of reception. When the writing unit 340 in the relay site storage 130 already holds write data written in the area $R_4$ in the storage unit 330, the writing unit 340 in the relay site storage 130 overwrites the already held write data with the write data $p_4$. In this case, the relay site storage 130 overwrites write data.

The relay site storage 130 transmits a response $q_4$ indicating write completion of the write data $p_4$ to the main site storage 120.

The main site storage 120 receives the response $q_4$ from the relay site storage 130.

The main site storage 120 immediately transmits a response $Q_4$ indicating write completion of the write data $P_4$ to the source of the write data $P_4$ (the main site host 100) according to the order of reception.

The main site host 100 receives the response $Q_4$ from the main site storage 120.

At this point in time, the relay site storage 130 holds a set of overwrite data $\{p_3(R_3, D_3), p_4(R_4, D_4)\}$. The area $R_2$ in the storage unit 310 in the main site storage 120 holds the data $D_4$. The area $R_4$ in the storage unit 330 in the relay site storage 130 holds the data $D_4$.

(5) Backing Up Data $D_4$

As illustrated in FIG. 4, the relay site storage 130 transmits the held write data $p_4(R_4, D_4)$ to the backup site storage 140. At this time, the relay site storage 130 changes the write destination of the received write data $p_4$ from the area $R_4$ to the area $R_6$ and transmits write data $r_4(R_6, D_4)$.

The backup site storage 140 receives the write data $r_4$ from the relay site storage 130.

The backup site storage 140 immediately writes the data $D_4$ into the area $R_6$ in the storage unit 350 according to the order of reception.

The backup site storage 140 transmits a response $s_1$ indicating write completion of the write data $r_4$ to the relay site storage 130.

The relay site storage 130 deletes the held write data $p_4$.

At this point in time, the relay site storage 130 holds a set of overwrite data $\{p_3(R_3, D_3)\}$. The area $R_6$ in the storage unit 350 in the backup site storage 140 holds the data $D_4$.

(6) Backing Up Data $D_3$

The relay site storage 130 transmits the held write data $p_3(R_3, D_3)$ to the backup site storage 140. At this time, the relay site storage 130 changes the write destination of the received write data $p_3$ from the area $R_3$ to the area $R_5$ and transmits write data $r_3(R_5, D_3)$.

The backup site storage 140 receives the write data $r_3$ from the relay site storage 130.

The backup site storage 140 immediately writes the data $D_3$ into the area $R_5$ in the storage unit 350 according to the order of reception.

The backup site storage 140 transmits a response $s_2$ indicating write completion of the write data $r_3$ to the relay site storage 130.

The relay site storage 130 deletes the held write data $p_3$.

At this point in time, the set of overwrite data held by the relay site storage 130 is empty. The area $R_5$ in the storage unit 350 in the backup site storage 140 holds the data $D_3$.

As described above, in the data backup system 500 according to the present example embodiment, integrity between data held by the storage unit 310 and data held by the storage unit 330 is always guaranteed by the writing unit 320 and the writing unit 340 by use of synchronous replication while the main site is operating normally. Then, after the main site stops operating normally, integrity between data held by the storage unit 330 and data held by the storage unit 350 is guaranteed by the writing unit 340 and the writing unit 360 after integrity-guaranteed replication is completed. Accordingly, the data backup system 500 according to the present example embodiment provides an effect that when the main site includes a plurality of storages, integrity of data among three sites including the main site can be guaranteed while the main site is operating normally, and after the main site stops operating normally, integrity of data between two sites excluding the main site can be guaranteed without copying all data.

Further, integrity-guaranteed replication is performed between the relay site and the backup site, in the data backup system 500 according to the present example embodiment. In other words, the data backup system 500 according to the present example embodiment provides an effect that the time (write time) required for receiving a response indicating write completion of write data after a host transmits the write data can be shortened compared with a case of performing synchronous replication among the main site, the relay site, and the backup site.

Further, communications for transmitting a plurality of pieces of write data between the relay site and the backup site can be collectively executed by providing suitable time intervals in the data backup system 500 according to the present example embodiment. In other words, the data backup system 500 according to the present example embodiment provides an effect that traffic between the relay site and the backup site can be leveled out (the maximum bandwidth of the network can be reduced).

When integrity-guaranteed replication is asynchronous replication in particular, an amount of data transmitted from a copy source to a copy destination can be reduced compared with a case of integrity-guaranteed replication being quasi-synchronous replication, in the data backup system 500 according to the present example embodiment. Accordingly, when integrity-guaranteed replication is asynchronous replication, the data backup system 500 according to the present example embodiment provides an effect that traffic required for replication can be reduced.

Further, the number of the relay site storage 130 in the data backup system 500 according to the present example embodiment is one. In other words, when integrity of data is guaranteed among three sites, only one backup device (the relay site storage 130 according to the present invention) is required in an intermediate backup site (the relay site according to the present invention) positioned midway between the main site and the lowermost backup site, in the data backup system 500 according to the present example embodiment. Accordingly, the data backup system 500 according to the present example embodiment provides an effect that a configuration of an intermediate backup site is simpler and can be provided more easily and economically compared with a case of the intermediate backup site including a plurality of backup devices.

SECOND EXAMPLE EMBODIMENT

Next, a second example embodiment of the present invention based on the first example embodiment of the present invention will be described. In a data backup system according to the present example embodiment, integrity-guaranteed replication is quasi-synchronous replication. Each of the numbers of main site storages and backup site storages, according to the present example embodiment, is two. The present example embodiment differs from the first example embodiment in including two backup site storages. Internal configurations and operations of a main site storage, a relay site storage, and a backup site storage will be described in more detail in the present example embodiment.

A configuration according to the present example embodiment will be described.

Figure 5:
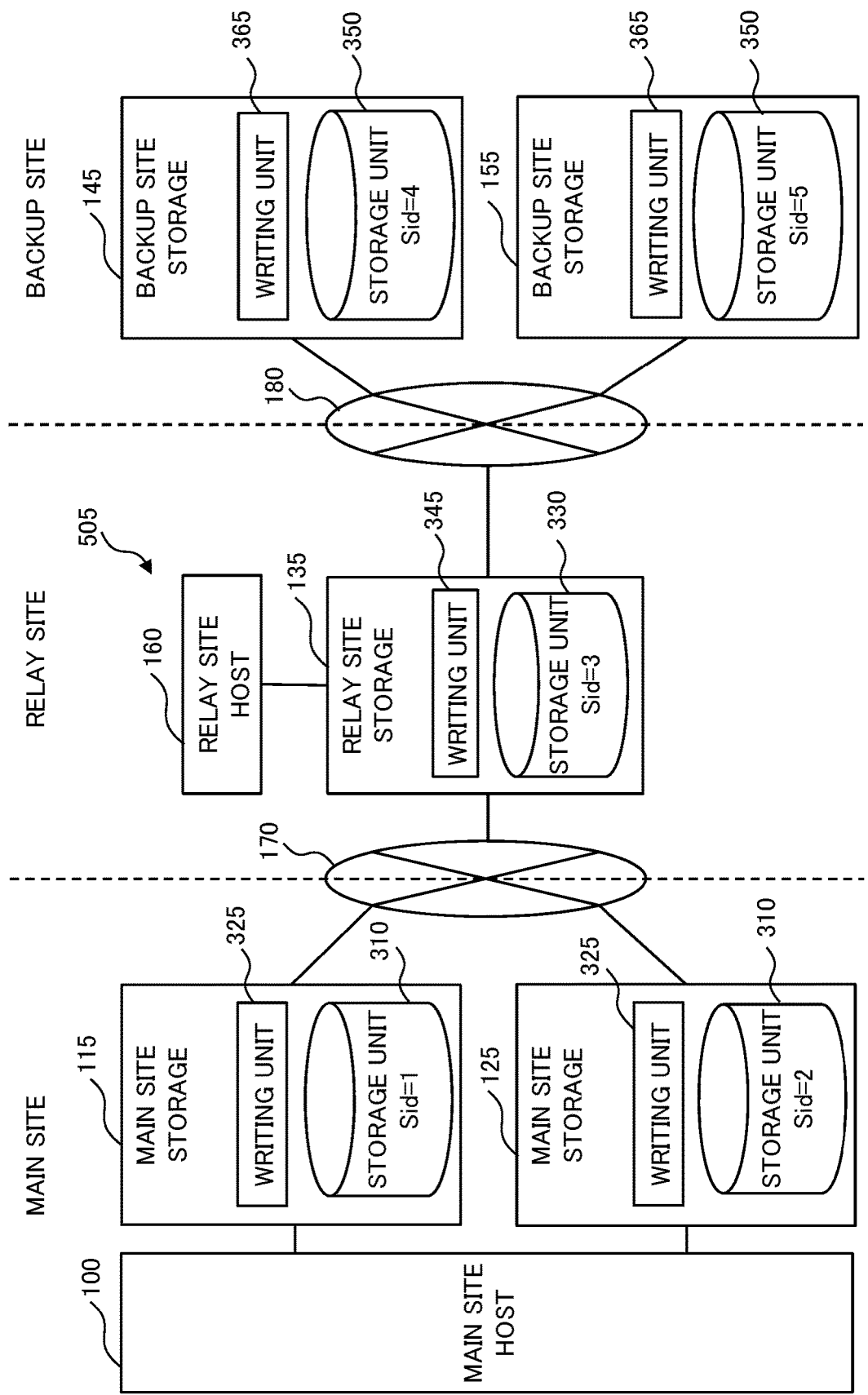
FIG. 5 is a block diagram illustrating an example of a configuration of a data backup system according to a second example embodiment of the present invention.

FIG. 5 is a block diagram illustrating an example of a configuration of a data backup system according to the second example embodiment of the present invention.

A data backup system 505 includes a main site, a relay site, and a backup site.

The main site includes a main site host 105 and main site storages 115 and 125.

The relay site includes a relay site storage 135 for primary backup.

The backup site includes backup site storages 145 and 155 for secondary backup.

Figure 6:
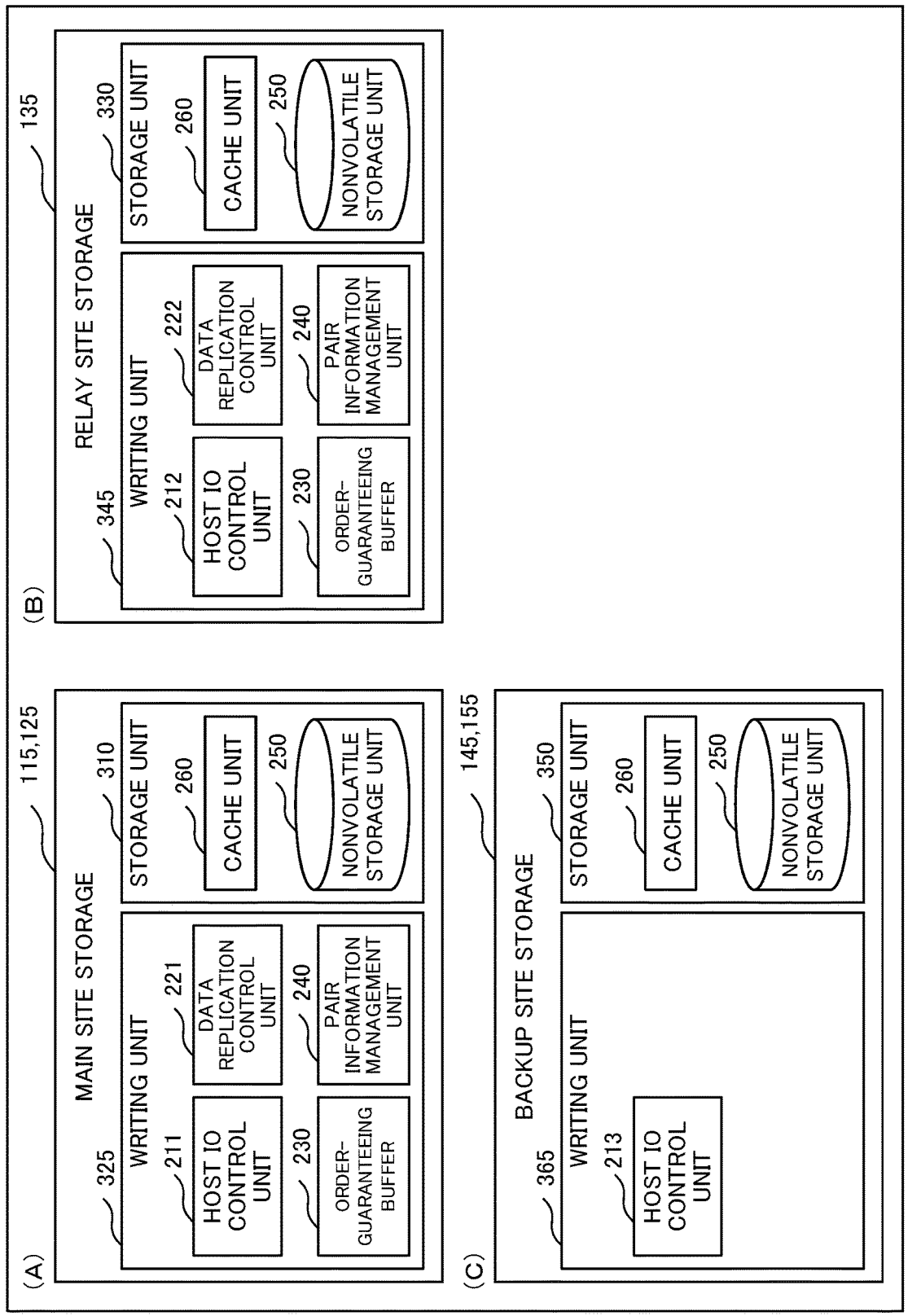
FIG. 6 is a block diagram illustrating examples of configurations of a main site storage, a relay site storage, and a backup site storage, according to the second example embodiment of the present invention.

FIG. 6 is a block diagram illustrating examples of configurations of the main site storage, the relay site storage, and the backup site storage, according to the second example embodiment of the present invention.

Each of the main site storages 115 and 125 includes a host IO control unit 211, a data replication control unit 221, an order-guaranteeing buffer 230, a pair information management unit 240, and a storage unit 310.

The relay site storage 135 includes a host IO control unit 212, a data replication control unit 222, an order-guaranteeing buffer 230, a pair information management unit 240, and a storage unit 330.

Each of the backup site storages 145 and 155 includes a host IO control unit 213, and a storage unit 350.

Each of storage units 310, 330, and 350 includes a nonvolatile storage unit 250 and a cache unit 260 with a writing capability faster than the nonvolatile storage unit 250.

FIG. 7 is a block diagram illustrating an example of a structure of the pair information management unit according to the second example embodiment of the present invention.

The pair information management unit 240 previously holds pair information about replication. The pair information is information for associating a pair of a storage identifier (storage ID) and a volume number (volume identifier) indicating the write destination [replication (copying) source] of write data for a certain replication with a pair of a storage ID and a volume number indicating the replication (copying) destination of the write data. It is assumed in the following description that storage ID=1 for the main site storage 115, storage ID=2 for the main site storage 125, storage ID=3 for the relay site storage 135, storage ID=4 for the backup site storage 145, and storage ID=5 for the backup site storage 155, as illustrated in FIG. 5. Pair information is denoted as (copy source storage ID, copy source volume number, copy destination storage ID, copy destination volume number).

In FIG. 7, the first row indicates pair information (1, 0000, 3, 0001), the second row indicates pair information (2, 0005, 3, 0009), the third row indicates pair information (3, 0002, 4, 0002), the fourth row indicates pair information (4, 0004, 5, 0005), the fifth row indicates pair information (3, 0001, 4, 0001), and the sixth row indicates pair information (3, 0009, 5, 0010).

Data are replicated (copied) among the main site storages 115 and 125, and the relay site storage 135 by use of synchronous replication.

Data are replicated (copied) between the relay site storage 135 and the backup site storage 145 or 155 by use of quasi-synchronous replication guaranteeing a data update order.

Replicated write data are stored in the order-guaranteeing buffer 230.

Figure 8:
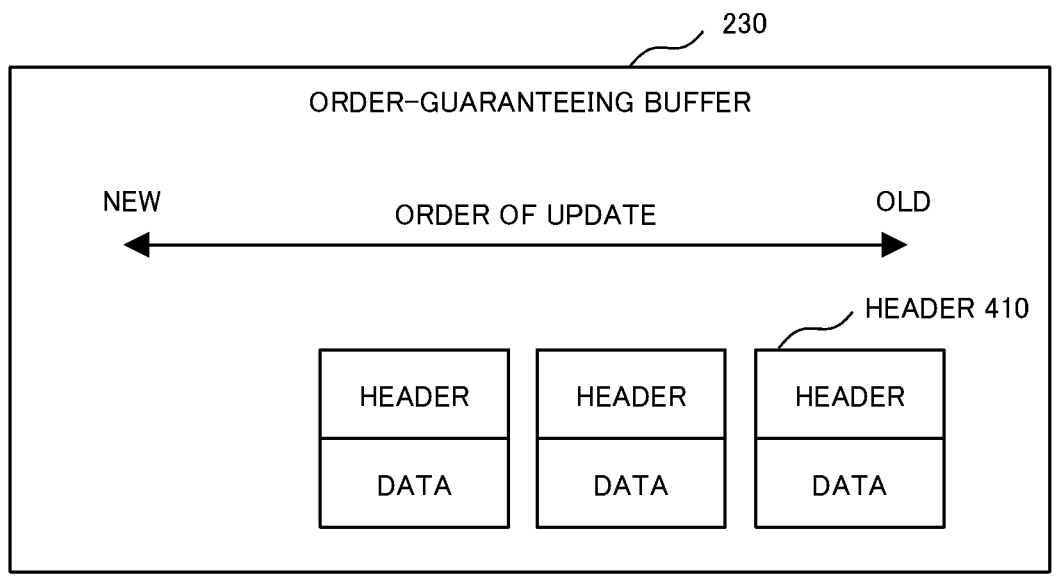
FIG. 8 is a schematic diagram illustrating an example of a structure of an order-guaranteeing buffer according to the second example embodiment of the present invention.

FIG. 8 is a schematic diagram illustrating an example of a structure of the order-guaranteeing buffer according to the second example embodiment of the present invention.

The order-guaranteeing buffer 230 holds replicated write data in the order of writing. Each piece of write data is associated with a header 410.

Figure 9:
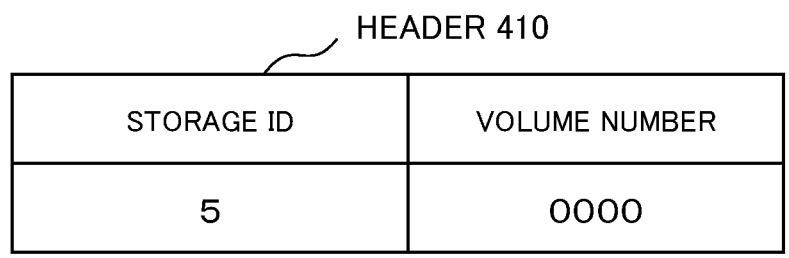
FIG. 9 is a schematic diagram illustrating an example of a structure of a header according to the second example embodiment of the present invention.

FIG. 9 is a schematic diagram illustrating an example of a structure of a header according to the second example embodiment of the present invention.

A header 410 includes a storage identifier and a volume identifier. The storage identifier is information (data) for identifying the write destination of the write data. The volume identifier is information (data) for identifying each storage area included in the write destination of the write data. A header 410 is hereinafter denoted as (storage ID, volume number).

In FIG. 9, the header 410 includes a pair of a storage ID and a volume number (5, 0000).

Each of the host IO control units 211, 212, and 213 writes received write data into the storage units 310, 330, and 350 and, the order-guaranteeing buffer 230 if the writing unit including the order-guaranteeing buffer 230, according to a pair of a storage ID and a volume number indicated by a header 410 associated with the write data.

When writing of write data into the cache unit 260 is completed, each of the host 10 control units 211, 212, and 213 immediately transmits a response indicating write completion of the write data and also writes the write data into the nonvolatile storage unit 250. Note that the host IO control unit 211 transmits a response indicating write completion of the write data after confirming copying completion of the write data stored in the order-guaranteeing buffer 230.

When transmitting write data stored in the order-guaranteeing buffer 230, each of the data replication control unit 221 and 222 transmits the write data after changing a header 410 associated with the write data, based on pair information.

With the configuration described above, when the main site includes a plurality of main site storages 115 and 125, the data backup system 505 guarantees integrity of data among three sites including the main site while the main site is operating normally and guarantees integrity of data between two sites excluding the main site without copying all data, after the main site stops operating normally.

An operation according to the present example embodiment will be described.

In the main site storages 115 and 125, the host IO control unit 211 receives write data from the main site host 105 and writes the received write data into the storage unit 310 and the order-guaranteeing buffer 230 according to the order of reception.

In the main site storages 115 and 125, the data replication control unit 221 rewrites the storage ID and the volume number of the copy destination in a header 410 related to the write data written in the order-guaranteeing buffer 230, according to pair information stored in the pair information management unit 240. Then, the data replication control unit 221 transmits the write data written in the order-guaranteeing buffer 230 to the relay site storage 135 by use of synchronous replication.

In the relay site storage 135, the host IO control unit 212 receives the write data from the main site storages 115 and 125 and writes the received write data into the storage unit 330 and the order-guaranteeing buffer 230 according to the order of reception.

In the relay site storage 135, the data replication control unit 222 rewrites the storage ID and the volume number of the copy destination in a header 410 related to the write data written in the order-guaranteeing buffer 230, according to pair information stored in the pair information management unit 240. When storage of the write data and the header 410 into the order-guaranteeing buffer 230 is completed, the data replication control unit 222 notifies the main site storage 115 or 125 from which the write data are transmitted of reception completion of the write data.

In the main site storages 115 and 125, when receiving reception completion of the write data, the host IO control unit 211 notifies the main site host 105 of write completion.

In the relay site storage 135, the data replication control unit 222 refers to the header 410 stored in the order-guaranteeing buffer 230 and transmits the write data to the backup site storage 145 or 155 related to the storage ID by use of quasi-synchronous replication.

In the backup site storages 145 and 155, when receiving the write data, the writing unit 365 notifies the relay site storage 135 of reception completion of the write data.

In the relay site storage 135, when receiving reception completion of the write data, the data replication control unit 222 deletes, from the order-guaranteeing buffer 230, the write data relevant to the reception completion.

As a result of the aforementioned operation, write data from the main site host 105 to a plurality of main site storages 115 and 125 are replicated in the relay site storage 135 and the backup site storage 145 or 155 in the order of writing, in the data backup system 505 according to the present example embodiment. Consequently, integrity of data stored in the storages (the main site storages 115 and 125, the relay site storage 135, and the backup site storages 145 and 155) among three sites (the main site, the relay site, and the backup site) including the main site is guaranteed while the main site is operating normally.

An operation related to a disaster operation in a case of the main site being stricken by a disaster will be described.

A job under normal conditions (when no disaster is occurring) is handled by the main site host 105 in the main site. At this time, the relay site host 160 in the relay site is not used. The relay site host 160 handles the job in place of the main site host 105 when the main site is stricken by a disaster.

When the main site is stricken by a disaster, integrity-guaranteed data copied from the main site storages 115 and 125 by use of synchronous replication are stored in the relay site storage 135. Consequently, the job can be resumed by the relay site host 160 immediately after the main site is stricken by the disaster.

When the job is resumed by the relay site host 160, the relay site storage 135 receives write data from the relay site host 160. Then, in the relay site storage 135, the data replication control unit 222 rewrites the storage ID and the volume number of the copy destination in a header 410 related to the write data received from the relay site host 160, according to pair information stored in the pair information management unit 240. When write data untransmitted to the backup site storages 145 and 155 are stored in the order-guaranteeing buffer 230, the data replication control unit 222 stores the write data received from the relay site host 160 at a position next to the untransmitted write data in the order-guaranteeing buffer 230.

Integrity between write data stored in the backup site storages 145 and 155, and data received from the relay site storage 135 before the main site is stricken by the disaster is guaranteed. Write data updated in the relay site after the main site is stricken by the disaster are transmitted from the relay site storage 135 after write data updated in the main site before the main site is stricken by the disaster. Consequently, integrity between data updated before and after the main site is stricken by the disaster is guaranteed.

In the relay site storage 135, when storage of the write data into the order-guaranteeing buffer 230 and update of the header 410 are completed, the data replication control unit 222 notifies the relay site host 160 of write completion. Consequently, integrity of data between the relay site and the backup site is guaranteed. In the backup site storages 145 and 155, when receiving the write data and the header 410, the writing unit 365 notifies the relay site storage 135 of reception completion of the write data. Then, the relay site storage 135 deletes, from the order-guaranteeing buffer 230, the write data and the header 410 relevant to the reception completion.

As a result of the aforementioned operation, integrity of data among the main site including a plurality of main site storages 115 and 125 immediately before being stricken by the disaster, and the relay site and the backup site is guaranteed in the data backup system 505 according to the present example embodiment. Then, integrity of data between the two sites excluding the main site is immediately guaranteed without copying all data, after the main site stops operating normally (for example, the main site is stricken by a disaster), in the data backup system 505. Then, for example, a disaster operation can be started in the two sites excluding the main site.

Figure 10:
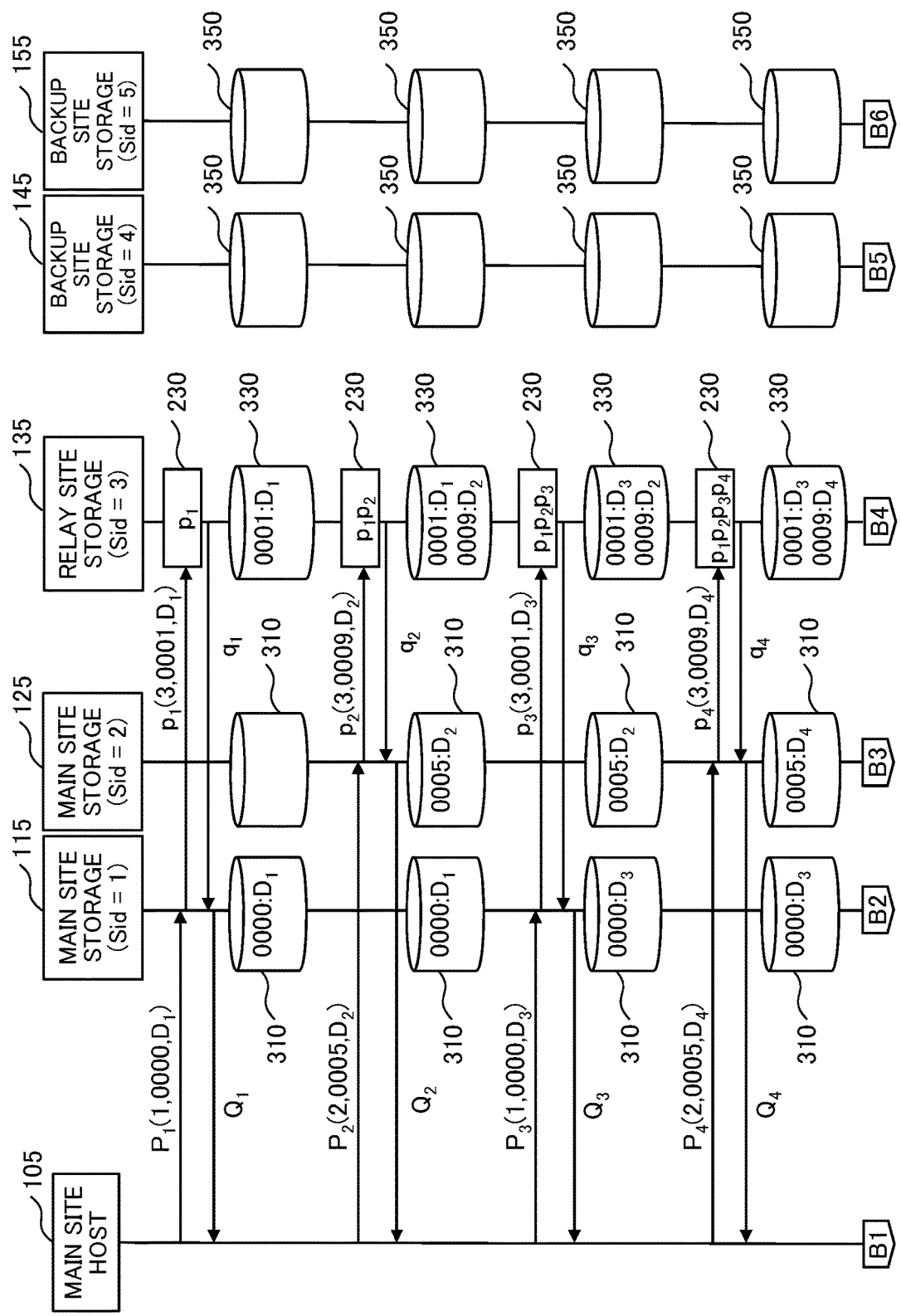
FIG. 10 is the first half of a sequence diagram illustrating an example of an operation of the data backup system according to the second example embodiment of the present invention.
Figure 11:
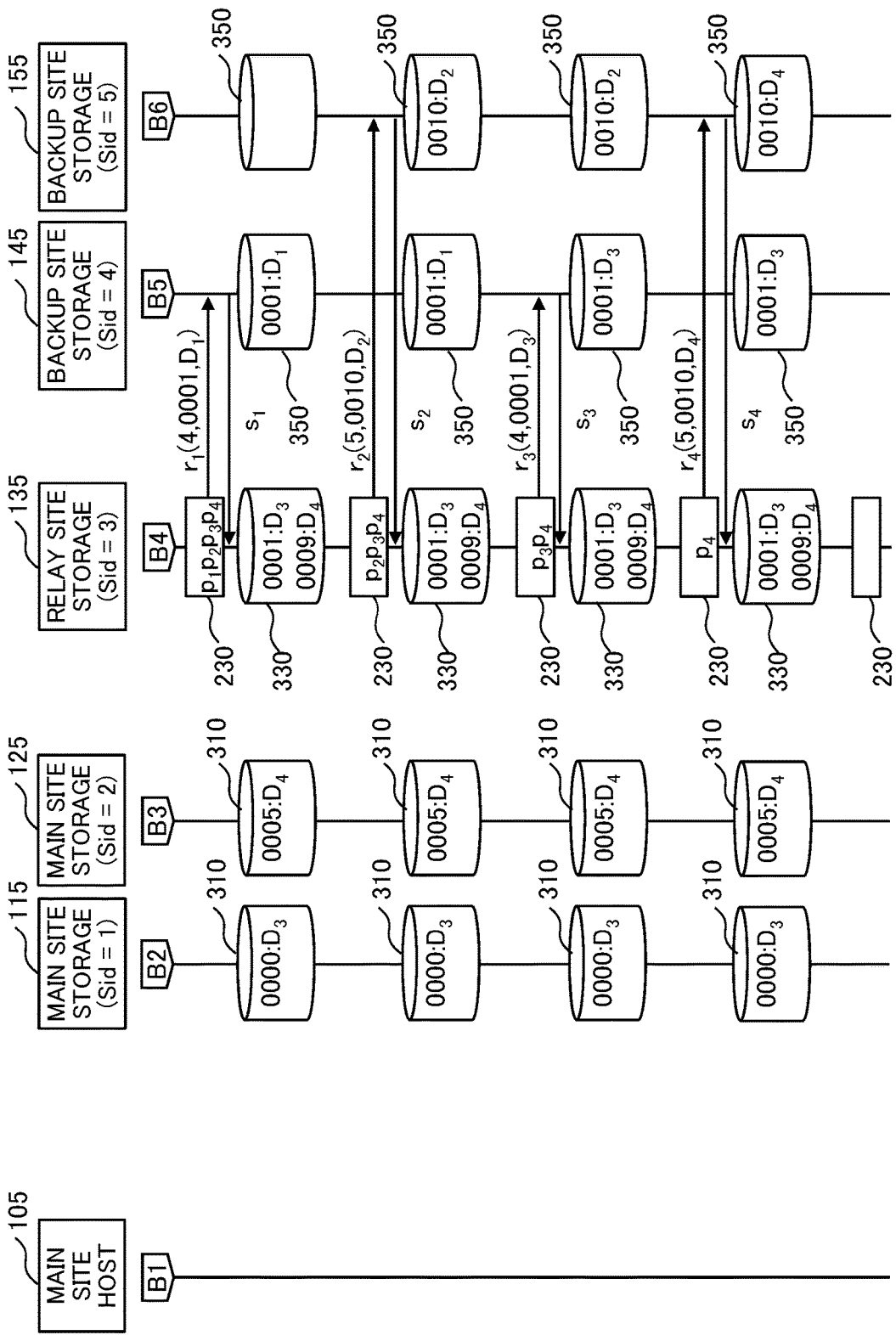
FIG. 11 is the second half of the sequence diagram illustrating the example of the operation of the data backup system according to the second example embodiment of the present invention.

FIG. 10 and FIG. 11 are sequence diagrams illustrating an example of an operation of the data backup system according to the second example embodiment of the present invention. FIG. 10 illustrates the first half of the operation, and FIG. 11 illustrates the second half of the operation.

In FIG. 10 and FIG. 11, write data are denoted as $P_n$, $p_n$, and $r_n$ (where n is a natural number), and responses to the respective pieces of write data are denoted as $Q_n$, $q_n$, and $s_n$. The first argument of write data indicates a storage ID of the write destination, the second argument indicates a volume number of the write destination, and the third argument indicates data to be written.

(1) Writing Data $D_1$

As illustrated in FIG. 10, the main site host 105 transmits write data $P_1(1, 0000, D_1)$ to the main site storage 115.

The main site storage 115 receives the write data $P_1$ from the main site host 105.

The main site storage 115 immediately writes the data $D_1$ into a volume (volume ID=0000) in the storage unit 310 (storage ID=1) according to the order of reception.

The main site storage 115 immediately transmits the write data $P_1$ to the relay site storage 135 according to the order of reception. At this time, the main site storage 115 changes a header 410 (1, 0000) associated with the received write data $P_1$ to a header 410 (3, 0001) according to the pair information (1, 0000, 3, 0001) and transmits write data $p_1$(3, 0001, $D_1$).

The relay site storage 135 receives the write data $p_1$ from the main site storage 115.

The relay site storage 135 immediately writes the data $D_1$ into a volume (volume ID=0001) in the storage unit 330 (storage ID=3) according to the order of reception.

The relay site storage 135 immediately stores the write data $p_1$ into the order-guaranteeing buffer 230 according to the order of reception.

The relay site storage 135 transmits a response $q_1$ indicating write completion of the write data $p_1$ to the main site storage 115.

The main site storage 115 receives the response $q_1$ from the relay site storage 135.

The main site storage 115 immediately transmits a response $Q_1$ indicating write completion of the write data $P_1$ to the source of the write data $P_1$ (the main site host 105) according to the order of reception.

The main site host 105 receives the response $Q_1$ from the main site storage 115.

At this point in time, the order-guaranteeing buffer 230 in the relay site storage 135 holds a string of write data ($p_1$). The volume (volume ID=0000) in the storage unit 310 (storage ID=1) in the main site storage 115 holds the data $D_1$. The volume (volume ID=0001) in the storage unit 330 (storage ID=3) in the relay site storage 135 holds the data $D_1$.

(2) Writing Data $D_2$

The main site host 105 transmits write data $P_2$(2, 0005, $D_2$) to the main site storage 125.

The main site storage 125 receives write data $P_2$ from the main site host 105.

The main site storage 125 immediately writes the data $D_2$ into a volume (volume ID=0005) in the storage unit 310 (storage ID=2) according to the order of reception.

The main site storage 125 immediately transmits the write data $P_2$ to the relay site storage 135 according to the order of reception. At this time, the main site storage 125 changes a header 410 (2, 0005) associated with the received write data $P_2$ to a header 410 (3, 0009) according to the pair information (2, 0005, 3, 0009) and transmits write data $p_2$(3, 0009, $D_2$).

The relay site storage 135 receives the write data $p_2$ from the main site storage 125.

The relay site storage 135 immediately writes the data $D_2$ into a volume (volume ID=0009) in the storage unit 330 (storage ID=3) according to the order of reception.

The relay site storage 135 immediately stores the write data $p_2$ into the order-guaranteeing buffer 230 according to the order of reception.

The relay site storage 135 transmits a response $q_2$ indicating write completion of the write data $p_2$ to the main site storage 125.

The main site storage 125 receives the response $q_2$ from the relay site storage 135.

The main site storage 125 immediately transmits a response $Q_2$ indicating write completion of the write data $P_2$ to the source of the write data $P_2$ (the main site host 105) according to the order of reception.

The main site host 105 receives the response $Q_2$ from the main site storage 125.

At this point in time, the order-guaranteeing buffer 230 in the relay site storage 135 holds a string of write data ($p_1$, $p_2$). The volume (volume ID=0005) in the storage unit 310 (storage ID=2) in the main site storage 125 holds the data $D_2$. The volume (volume ID=0009) in the storage unit 330 (storage ID=3) in the relay site storage 135 holds the data $D_2$.

(3) Writing Data $D_3$ The main site host 105 transmits write data $P_3$(1, 0000, $D_3$) to the main site storage 115.

The main site storage 115 receives the write data $P_3$ from the main site host 105.

The main site storage 115 immediately writes the data $D_3$ into the volume (volume ID=0000) in the storage unit 310 (storage ID=1) according to the order of reception.

The main site storage 115 immediately transmits the write data $P_3$ to the relay site storage 135 according to the order of reception. At this time, the main site storage 115 changes the header 410 (1, 0000) associated with the received write data $P_3$ to the header 410 (3, 0001) according to the pair information (1, 0000, 3, 0001) and transmits write data $p_3$(3, 0001, $D_3$).

The relay site storage 135 receives the write data $p_3$ from the main site storage 115.

The relay site storage 135 immediately writes the data $D_3$ into the volume (volume ID=0001) in the storage unit 330 (storage ID=3) according to the order of reception.

The relay site storage 135 immediately stores the write data $p_3$ into the order-guaranteeing buffer 230 according to the order of reception.

The relay site storage 135 transmits a response $q_3$ indicating write completion of the write data $p_3$ to the main site storage 115.

The main site storage 115 receives the response $q_3$ from the relay site storage 135.

The main site storage 115 immediately transmits a response $Q_3$ indicating write completion of the write data $P_3$ to the source of the write data $P_3$ (the main site host 105) according to the order of reception.

The main site host 105 receives the response $Q_3$ from the main site storage 115.

At this point in time, the order-guaranteeing buffer 230 in the relay site storage 135 holds a string of write data ($p_1$, $p_2$, $p_3$). The volume (volume ID=0000) in the storage unit 310 (storage ID=1) in the main site storage 115 holds the data $D_3$. The volume (volume ID=0001) in the storage unit 330 (storage ID=3) in the relay site storage 135 holds the data $D_3$.

(4) Writing data $D_4$

The main site host 105 transmits write data $P_4$(2, 0005, $D_4$) to the main site storage 125.

The main site storage 125 receives the write data $P_4$ from the main site host 105.

The main site storage 125 immediately writes the data $D_4$ into the volume (volume ID=0005) in the storage unit 310 (storage ID=2) according to the order of reception.

The main site storage 125 immediately transmits the write data $P_4$ to the relay site storage 135 according to the order of reception. At this time, the main site storage 125 changes the header 410 (2, 0005) associated with the received write data $P_4$ to the header 410 (3, 0009) according to the pair information (2, 0005, 3, 0009) and transmits write data $p_4$(3, 0009, $D_4$).

The relay site storage 135 receives the write data $p_4$ from the main site storage 125.

The relay site storage 135 immediately writes the data $D_4$ into the volume (volume ID=0009) in the storage unit 330 (storage ID=3) according to the order of reception.

The relay site storage 135 immediately stores the write data $p_4$ into the order-guaranteeing buffer 230 according to the order of reception.

The relay site storage 135 transmits a response $q_4$ indicating write completion of the write data $p_4$ to the main site storage 125.

The main site storage 125 receives the response $q_4$ from the relay site storage 135.

The main site storage 125 immediately transmits a response $Q_4$ indicating write completion of the write data $P_4$ to the source of the write data $P_4$ (the main site host 105) according to the order of reception.

The main site host 105 receives the response $Q_4$ from the main site storage 125.

At this point in time, the order-guaranteeing buffer 230 in the relay site storage 135 holds a string of write data ($p_1$, $p_2$, $p_3$, $p_4$). The volume (volume ID=0005) in the storage unit 310 (storage ID=2) in the main site storage 125 holds the data $D_4$. The volume (volume ID=0009) in the storage unit 330 (storage ID=3) in the relay site storage 135 holds the data $D_4$.

(5) Backing Up Data $D_1$

As illustrated in FIG. 11, the relay site storage 135 transmits the write data $p_1$(3, 0001, $D_1$) stored at the top of the order-guaranteeing buffer 230 to the backup site storage 145. At this time, the relay site storage 135 changes the header 410 (3, 0001) associated with the received write data $p_1$ to a header 410 (4, 0001) according to the pair information (3, 0001, 4, 0001) and transmits write data $r_1$(4, 0001, $D_1$).

The backup site storage 145 receives the write data $r_1$ from the relay site storage 135.

The backup site storage 145 immediately writes the data $D_1$ into a volume (volume ID=0001) in the storage unit 350 (storage ID=4) according to the order of reception.

The backup site storage 145 transmits a response $s_1$ indicating write completion of the write data $r_1$ to the relay site storage 135.

The relay site storage 135 deletes the write data $p_1$ from the order-guaranteeing buffer 230.

At this point in time, the order-guaranteeing buffer 230 in the relay site storage 135 holds a string of write data ($p_2$, $p_3$, $p_4$). The volume (volume ID=0001) in the storage unit 350 (storage ID=4) in the backup site storage 145 holds the data $D_1$.

(6) Backing Up Data $D_2$

The relay site storage 135 transmits the write data $p_2$(3, 0009, $D_2$) stored at the top of the order-guaranteeing buffer 230 to the backup site storage 155. At this time, the relay site storage 135 changes the header 410 (3, 0009) associated with the received write data $p_2$ to a header 410 (5, 0010) according to the pair information (3, 0009, 5, 0010) and transmits write data $r_2$(5, 0010, $D_2$).

The backup site storage 155 receives the write data $r_2$ from the relay site storage 135.

The backup site storage 155 immediately writes the data $D_2$ into a volume (volume ID=0010) in the storage unit 350 (storage ID=5) according to the order of reception.

The backup site storage 155 transmits a response $s_2$ indicating write completion of the write data $r_2$ to the relay site storage 135.

The relay site storage 135 deletes the write data $p_2$ from the order-guaranteeing buffer 230.

At this point in time, the order-guaranteeing buffer 230 in the relay site storage 135 holds a string of write data ($p_3$, $p_4$). The volume (volume ID=0010) in the storage unit 350 (storage ID=5) in the backup site storage 155 holds the data $D_2$.

(7) Backing Up Data $D_3$

The relay site storage 135 transmits the write data $p_3$(3, 0001, $D_3$) stored at the top of the order-guaranteeing buffer 230 to the backup site storage 145. At this time, the relay site storage 135 changes the header 410 (3, 0001) associated with the received write data $p_3$ to the header 410 (4, 0001) according to the pair information (3, 0001, 4, 0001) and transmits write data $r_3$(4, 0001, $D_3$).

The backup site storage 145 receives the write data $r_3$ from the relay site storage 135.

The backup site storage 145 immediately writes the data $D_3$ into the volume (volume ID=0001) in the storage unit 350 (storage ID=4) according to the order of reception.

The backup site storage 145 transmits a response $s_3$ indicating write completion of the write data $r_3$ to the relay site storage 135.

The relay site storage 135 deletes the write data $p_3$ from the order-guaranteeing buffer 230.

At this point in time, the order-guaranteeing buffer 230 in the relay site storage 135 holds a string of write data ($p_4$). The volume (volume ID=0001) in the storage unit 350 (storage ID=4) in the backup site storage 145 holds the data $D_3$.

(8) Backing Up Data $D_4$

The relay site storage 135 transmits the write data $p_4$(3, 0009, $D_4$) stored at the top of the order-guaranteeing buffer 230 to the backup site storage 155. At this time, the relay site storage 135 changes the header 410 (3, 0009) associated with the received write data $p_4$ to the header 410 (5, 0010) according to the pair information (3, 0009, 5, 0010) and transmits write data $r_4$(5, 0010, $D_4$).

The backup site storage 155 immediately writes the data $D_4$ into the volume (volume ID=0010) in the storage unit 350 (storage ID=5) according to the order of reception.

The backup site storage 155 immediately writes the data $D_2$ into the volume (volume ID=0010) in the storage unit 350 (storage ID=5) according to the order of reception.

The backup site storage 155 transmits a response $s_4$ indicating write completion of the write data $r_4$ to the relay site storage 135.

The relay site storage 135 deletes the write data $p_4$ from the order-guaranteeing buffer 230.

At this point in time, the order-guaranteeing buffer 230 in the relay site storage 135 is empty. The volume (volume ID=0010) in the storage unit 350 (storage ID=5) in the backup site storage 155 holds the data $D_4$.

As described above, the data backup system 505 according to the present example embodiment provides an effect that when the main site includes a plurality of storages (the main site storages 115 and 125), integrity of data among three sites including the main site can be guaranteed while the main site is operating normally, and integrity of data between two sites excluding the main site can be guaranteed without copying all data, after the main site stops operating normally.

In the aforementioned description, a case of integrity of data among the relay site storage 135 and the backup site storages 145 and 155 being achieved by use of quasi-synchronous replication has been described. However, quasi-synchronous replication may be replaced by asynchronous replication guaranteeing a data writing order.

Further, while a case of each of the numbers of the main site storages 115 and 125 and the backup site storages 145 and 155 being two has been described, there may be three or more main site storages and there may be one or more backup site storages.

Figure 12:
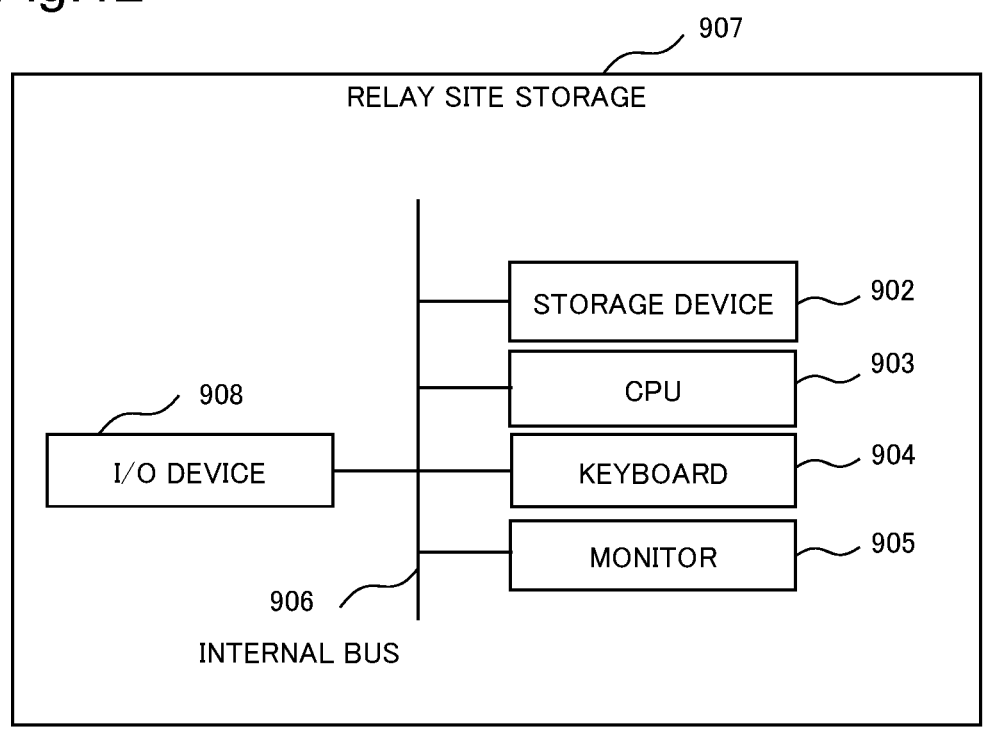
FIG. 12 is a block diagram illustrating an example of a hardware configuration capable of providing a relay site storage according to each example embodiment of the present invention.

FIG. 12 is a block diagram illustrating an example of a hardware configuration capable of providing the relay site storage according to each example embodiment of the present invention.

A relay site storage 907 includes a storage device 902, a central processing unit (CPU) 903, a keyboard 904, a monitor 905, and an input/output (I/O) device 908, which are interconnected through an internal bus 906. The storage device 902 stores operation programs of the CPU 903, such as writing units 320, 325, 340, 345, 360, and 365. The CPU 903 controls the entire relay site storage 907, executes the operation programs stored in the storage device 902, and performs execution of the programs such as the writing units 320, 325, 340, 345, 360, and 365, and transmission and reception of data by the I/O device 908. The internal configuration of the aforementioned relay site storage 907 is an example. The relay site storage 907 may be a device configured to connect the keyboard 904 and the monitor 905 as needed.

The aforementioned relay site storage 907 according to each example embodiment of the present invention may be provided by a dedicated device but may also be provided by a computer (information processing device) except for an operation of hardware executing communication with outside by the I/O device 908. For example, the I/O device 908 according to each example embodiment of the present invention is an input/output unit communicating with the relay site storage 907 and the like. In this case, such a computer reads a software program stored in the storage device 902 into the CPU 903 and executes the read software program at the CPU 903. In the case of each of the aforementioned example embodiments, such a software program has only to include a description capable of providing the functions of the units in the relay site storage 907 that are illustrated in FIG. 1, FIG. 5, and FIG. 6, as described above. However, the units are also assumed to include hardware as appropriate. In such a case, such a software program (computer program) can be viewed to constitute the present invention. Furthermore, a computer-readable storage medium having such a software program stored thereon can also be viewed to constitute the present invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

A data backup system including:

a plurality of main site storages, each main site storage being installed in a main site and including:

a first storage means; and a first writing means for, when receiving write data from a main site host installed in the main site, immediately writing the write data into the first storage means according to an order of reception;

one relay site storage being installed in a relay site, being connected to the plurality of main site storages, and including:

a second storage means; and a second writing means for, when receiving write data from a relay site host installed in the relay site or any one of the plurality of main site storages, immediately writing the write data into the second storage means according to an order of reception; and one or more backup site storages, each backup site storage being installed in a backup site, being connected to the relay site storage, and including:

a third storage means; and a third writing means for, when receiving write data from the relay site storage, immediately writing the write data into the third storage means according to an order of reception, wherein the first writing means, when receiving write data, immediately transmits the write data to the relay site storage according to an order of reception and, when receiving a response indicating write completion of the write data from the relay site storage, immediately transmits the response to a source of the write data according to an order of reception, and the second writing means, when receiving write data, immediately transmits a response indicating write completion of the write data to a source of the write data according to an order of reception, and also performs storing that the write data are untransmitted to a backup site storage and transmitting, to the backup site storage, write data allowing generation of a copy of data held by the second storage means by overwriting data held by the third storage means with the write data.

(Supplementary Note 2)

The data backup system according to Supplementary Note 1, wherein write data transmitted to the backup site storage by the second writing means are a series of write data received but untransmitted by the second writing means in which an area where data are to be written and an order of writing data are defined for data held by the third storage means.

(Supplementary Note 3)

The data backup system according to Supplementary Note 1, wherein write data transmitted to the backup site storage by the second writing means are a series of data held by the second storage means in which areas where data are to be written without overlapping one another are defined for data held by the third storage means.

(Supplementary Note 4)

The data backup system according to Supplementary Note 2 or 3, wherein the area where data are to be written is identified by an identifier specifying a position of the area where data are to be written or an identifier specifying a name of the area where data are to be written, in the third storage means.

(Supplementary Note 5)

The data backup system according to any one of Supplementary Notes 1 to 4, wherein the relay site host monitors execution of processing, by the main site host, including writing and reading data into and from the main site storage, and, after failing to confirm normal execution of monitored processing, starts execution of processing corresponding to processing executed by the main site host and including writing and reading data into and from the relay site storage.

(Supplementary Note 6)

The data backup system according to any one of Supplementary Notes 1 to 5, wherein write data transmitted by the main site host, the relay site host, and the plurality of main site storages are associated with a header, the header includes:
a storage identifier for identifying a write destination into which the write data are to be written, the write destination being any one of a first storage means, a second storage means, and a third storage means; and
a volume identifier for identifying each storage area included in the write destination into which the write data are to be written, and each of the first writing means and the second writing means
previously holds pair information for associating a first pair of the storage identifier and the volume identifier that are included in the header associated with received write data with a second pair of the storage identifier and the volume identifier that are to be included in the header associated with write data to be transmitted, and,
when transmitting write data, transmits the header associated with received write data after changing the header, based on the pair information.

(Supplementary Note 7)

The data backup system according to any one of Supplementary Notes 1 to 6, wherein
the first storage means includes:
a nonvolatile storage means; and
a cache means with a writing capability faster than the nonvolatile storage means, and, when writing of write data into the cache means is completed, the first writing means
immediately transmits a response indicating write completion of the write data and also
writes the write data into the nonvolatile storage means.

(Supplementary Note 8)

The data backup system according to Supplementary Note 7, wherein
the second storage means includes:
the nonvolatile storage means; and
the cache means, and, when writing of write data into the cache means is completed, the second writing means
immediately transmits a response indicating write completion of the write data and also
writes the write data into the nonvolatile storage means.

(Supplementary Note 9)

A relay site storage included in the data backup system according to any one of Supplementary Notes 1 to 8.

(Supplementary Note 10)

A data backup method for a data backup system including:
a plurality of main site storages, each main site storage being installed in a main site and including:
a first storage means; and
a first writing means for, when receiving write data from a main site host installed in the main site, immediately writing the write data into the first storage means according to an order of reception;
one relay site storage being installed in a relay site, being connected to the plurality of main site storages, and including:
a second storage means; and
a second writing means for, when receiving write data from a relay site host installed in the relay site or any one of the plurality of main site storages, immediately writing the write data into the second storage means according to an order of reception; and
one or more backup site storages, each backup site storage being installed in a backup site, being connected to the relay site storage, and including:
a third storage means; and
a third writing means for, when receiving write data from the relay site storage, immediately writing the write data into the third storage means according to an order of reception, the data backup method including:
by the first writing means,
when receiving write data, immediately transmitting the write data to the relay site storage according to an order of reception, and,
when receiving a response indicating write completion of the write data from the relay site storage, immediately transmitting the response to a source of the write data according to an order of reception; and,
by the second writing means,
when receiving write data,
immediately transmitting a response indicating write completion of the write data to a source of the write data according to an order of reception, and also
performing
storing that the write data are untransmitted to a backup site storage and
transmitting, to the backup site storage, write data allowing generation of a copy of data held by the second storage means by overwriting data held by the third storage means with the write data.

(Supplementary Note 11)

A control program for a relay site storage in a data backup system including:
a plurality of main site storages, each main site storage being installed in a main site and including:
a first storage means; and
a first writing means for, when receiving write data from a main site host installed in the main site, immediately writing the write data into the first storage means according to an order of reception;
one relay site storage being installed in a relay site, being connected to the plurality of main site storages, and including:
a second storage means; and
a second writing means for, when receiving write data from a relay site host installed in the relay site or any one of the plurality of main site storages, immediately writing the write data into the second storage means according to an order of reception; and
one or more backup site storages, each backup site storage being installed in a backup site, being connected to the relay site storage, and including:
a third storage means; and
a third writing means for, when receiving write data from the relay site storage, immediately writing the write data into the third storage means according to an order of reception, the control program causing a computer included in the relay site storage in a case of the first writing means,
when receiving write data, immediately transmitting the write data to the relay site storage according to an order of reception, and,
when receiving a response indicating write completion of the write data from the relay site storage, immediately transmitting the response to a source of the write data according to an order of reception to execute:
processing of, when receiving write data,
immediately transmitting a response indicating write completion of the write data to a source of the write data according to an order of reception, and also storing that the write data are untransmitted to a backup site storage; and
processing of transmitting, to the backup site storage, write data allowing generation of a copy of data held by the second storage means by overwriting data held by the third storage means with the write data.

This application is based upon and claims the benefit of priority from Japanese patent application No. 2017-228300, filed on Nov. 28, 2017, the disclosure of which is incorporated herein in its entirety by reference.

INDUSTRIAL APPLICABILITY

The present invention can be used for a purpose of performing a disaster operation of a service using storages.

REFERENCE SIGNS LIST

100 Main site host
110, 120 Main site storage
130 Relay site storage
140 Backup site storage
160 Relay site host
170, 180 Network
310, 330, 350 Storage unit
320, 340, 360 Writing unit
500 Data backup system
105 Main site host
115, 125 Main site storage
135 Relay site storage
145, 155 Backup site storage
211, 212, 213 Host IO control unit
221, 222, 223 Data replication control unit
230 Order-guaranteeing buffer
240 Pair information management unit
505 Data backup system
902 Storage device
903 CPU
906 Internal bus
907 Relay site storage
908 I/O device

The invention claimed is:
1. A data backup system comprising:
a plurality of main site storages, each main site storage being installed in a main site and including:
a first storage unit; and
a first writing unit configured to, when receiving write data from a main site host installed in the main site, immediately write the write data into the first storage unit according to an order of reception;
one relay site storage being installed in a relay site, being connected to the plurality of main site storages, and including:
a second storage unit; and
a second writing unit configured to, when receiving the write data from a relay site host installed in the relay site or from any one of the plurality of main site storages, immediately write the write data into the second storage unit according to the order of reception; and
one or more backup site storages, each backup site storage being installed in a backup site, being connected to the relay site storage, and including:
a third storage unit; and
a third writing unit configured to, when receiving the write data from the relay site storage, immediately write the write data into the third storage unit according to the order of reception, wherein
the first writing unit:
when receiving the write data, immediately transmits the write data to the relay site storage according to the order of reception; and
when receiving a first response indicating write completion of the write data from the relay site storage, immediately transmits the first response to a source of the write data according to the order of reception, and
the second writing unit, when receiving the write data:
immediately transmits a second response indicating the write completion of the write data to the source of the write data according to the order of reception;
stores information indicating that the write data are untransmitted to a backup site storage; and
transmits, to the backup site storage, the write data allowing generation of a copy of data held by the second storage unit by overwriting the data held by the third storage unit with the write data, wherein
the write data transmitted by the main site host, the relay site host, and the plurality of main site storages are associated with a header,
the header includes:
a storage identifier for identifying a write destination into which the write data are to be written, the write destination being any one of the first storage unit, the second storage unit, and third storage unit; and
a volume identifier for identifying each of one or more storage areas included in the write destination into which the write data are to be written, and
each of the first writing unit and the second writing unit:
previously holds pair information for associating a first pair of the storage identifier and the volume identifier that are included in the header associated with received write data with a second pair of the storage identifier and the volume identifier that are to be included in the header associated with the write data to be transmitted; and
when transmitting the write data, transmits the header associated with the received write data after changing the header, based on the pair information.

2. The data backup system according to claim 1, wherein the write data transmitted to the backup site storage by the second writing unit are a series of write data received but untransmitted by the second writing unit in which an area where the data are to be written and an order of writing data are defined for the data held by the third storage unit.

3. The data backup system according to claim 2, wherein the area where the data are to be written is identified by an identifier specifying a position of the area where the data are to be written or an identifier specifying a name of the area where the data are to be written, in the third storage unit.

4. The data backup system according to claim 3, wherein the relay site host:
monitors execution of processing, by the main site host, including writing and reading the data into and from the main site storage; and
after failing to confirm normal execution of monitored processing, starts execution of processing corresponding to processing executed by the main site host and including writing and reading the data into and from the relay site storage.

5. The data backup system according to claim 2, wherein the relay site host:
monitors execution of processing, by the main site host, including writing and reading the data into and from the main site storage; and
after failing to confirm normal execution of monitored processing, starts execution of processing corresponding to processing executed by the main site host and including writing and reading the data into and from the relay site storage.

6. The data backup system according to claim 1, wherein the write data transmitted to the backup site storage by the second writing unit are a series of the data held by the second storage unit in which areas where the data are to be written without overlapping one another are defined for the data held by the third storage unit.

7. The data backup system according to claim 6, wherein each of the areas where the data are to be written is identified by an identifier specifying a position of the area where the data are to be written or an identifier specifying a name of the area where the data are to be written, in the third storage unit.

8. The data backup system according to claim 6, wherein the relay site host:
monitors execution of processing, by the main site host, including writing and reading the data into and from the main site storage; and
after failing to confirm normal execution of monitored processing, starts execution of processing corresponding to processing executed by the main site host and including writing and reading the data into and from the relay site storage.

9. The data backup system according to claim 1, wherein the relay site host:
monitors execution of processing, by the main site host, including writing and reading the data into and from the main site storage; and
after failing to confirm normal execution of monitored processing, starts execution of processing corresponding to the processing executed by the main site host and including writing and reading the data into and from the relay site storage.

10. The data backup system according to claim 1, wherein the first storage unit includes:
a nonvolatile storage unit; and
a cache unit with a writing capability faster than the nonvolatile storage unit, and
when writing of the write data into the cache unit is completed, the first writing unit immediately transmits the first response indicating write completion of the write data and writes the write data into the nonvolatile storage unit.

11. The data backup system according to claim 10, wherein
the second storage unit includes:
the nonvolatile storage unit; and
the cache unit, and
when writing of the write data into the cache unit is completed, the second writing unit immediately transmits the second response indicating write completion of the write data and writes the write data into the nonvolatile storage unit.

12. A data backup method for a data backup system including:
a plurality of main site storages, each main site storage being installed in a main site and including:
a first storage unit; and
a first writing unit configured to, when receiving write data from a main site host installed in the main site, immediately write the write data into the first storage unit according to an order of reception;
one relay site storage being installed in a relay site, being connected to the plurality of main site storages, and including:
a second storage unit; and
a second writing unit configured to, when receiving the write data from a relay site host installed in the relay site or from any one of the plurality of main site storages, immediately write the write data into the second storage unit according to the order of reception; and
one or more backup site storages, each backup site storage being installed in a backup site, being connected to the relay site storage, and including:
a third storage unit; and
a third writing unit configured to, when receiving the write data from the relay site storage, immediately write the write data into the third storage unit according to the order of reception, the data backup method comprising:
by the first writing unit:
when receiving the write data, immediately transmitting the write data to the relay site storage according to the order of reception; and
when receiving a first response indicating write completion of the write data from the relay site storage, immediately transmitting the first response to a source of the write data according to the order of reception; and
by the second writing unit, when receiving the write data:
immediately transmitting a second response indicating write completion of the write data to the source of the write data according to the order of reception;
storing information indicating that the write data are untransmitted to a backup site storage; and
transmitting, to the backup site storage, the write data allowing generation of a copy of data held by the second storage unit by overwriting the data held by the third storage unit with the write data, wherein
the write data transmitted by the main site host, the relay site host, and the plurality of main site storages are associated with a header,
the header includes:
a storage identifier for identifying a write destination into which the write data are to be written, the write destination being any one of the first storage unit, the second storage unit, and third storage unit; and a volume identifier for identifying each of one or more storage areas included in the write destination into which the write data are to be written, and each of the first writing unit and the second writing unit:
  previously holds pair information for associating a first pair of the storage identifier and the volume identifier that are included in the header associated with received write data with a second pair of the storage identifier and the volume identifier that are to be included in the header associated with the write data to be transmitted; and
  when transmitting the write data, transmits the header associated with the received write data after changing the header, based on the pair information.

13. A non-transitory storage medium having a control program for a relay site storage stored thereon in a data backup system including:
  a plurality of main site storages, each main site storage being installed in a main site and including:
    a first storage unit; and
    a first writing unit configured to, when receiving write data from a main site host installed in the main site, immediately write the write data into the first storage unit according to an order of reception;
  one relay site storage being installed in a relay site, being connected to the plurality of main site storages, and including:
    a second storage unit; and
    a second writing unit configured to, when receiving the write data from a relay site host installed in the relay site or from any one of the plurality of main site storages, immediately write the write data into the second storage unit according to the order of reception; and
  one or more backup site storages, each backup site storage being installed in a backup site, being connected to the relay site storage, and including:
    a third storage unit; and
    a third writing unit configured to, when receiving the write data from the relay site storage, immediately write the write data into the third storage unit according to the order of reception, the control program causing a computer included in the relay site storage in a case of;

by the first writing unit:
  when receiving the write data, immediately transmitting the write data to the relay site storage according to the order of reception; and
  when receiving a first response indicating write completion of the write data from the relay site storage, immediately transmitting the first response to a source of the write data according to the order of reception; and by the second writing unit, when receiving the write data:
  immediately transmitting a second response indicating write completion of the write data to the source of the write data according to the order of reception;
  storing information indicating that the write data are untransmitted to a backup site storage; and
  transmitting, to the backup site storage, the write data allowing generation of a copy of data held by the second storage unit by overwriting the data held by the third storage unit with the write data, wherein the write data transmitted by the main site host, the relay site host, and the plurality of main site storages are associated with a header, the header includes:
  a storage identifier for identifying a write destination into which the write data are to be written, the write destination being any one of the first storage unit, the second storage unit, and third storage unit; and
  a volume identifier for identifying each of one or more storage areas included in the write destination into which the write data are to be written, and each of the first writing unit and the second writing unit:
  previously holds pair information for associating a first pair of the storage identifier and the volume identifier that are included in the header associated with received write data with a second pair of the storage identifier and the volume identifier that are to be included in the header associated with the write data to be transmitted; and
  when transmitting the write data, transmits the header associated with the received write data after changing the header, based on the pair information.

* * * * *